(12) United States Patent
Zhang et al.

(10) Patent No.: US 12,338,165 B2
(45) Date of Patent: Jun. 24, 2025

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Daming Zhang, Shanghai (CN); Nilanjan Sarangi, Shrewsbury, MA (US); Zhongya Zhang, Shanghai (CN); Lu Lu, Shanghai (CN)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 1091 days.

(21) Appl. No.: 17/097,864

(22) Filed: Nov. 13, 2020

(65) Prior Publication Data

US 2021/0147284 A1 May 20, 2021

(30) Foreign Application Priority Data

Nov. 15, 2019 (CN) .......................... 201911126711.2

(51) Int. Cl.
*B24D 3/34* (2006.01)
*C03C 3/091* (2006.01)
*C03C 14/00* (2006.01)

(52) U.S. Cl.
CPC .............. *C03C 14/004* (2013.01); *B24D 3/34* (2013.01); *B24D 3/342* (2013.01); *C03C 3/091* (2013.01); *C03C 2214/04* (2013.01)

(58) Field of Classification Search
CPC .... C03C 14/004; C03C 3/091; C03C 2214/04
See application file for complete search history.

(56) References Cited

U.S. PATENT DOCUMENTS

| 2,102,343 A | 12/1937 | Whitcomb et al. |
| 2,495,606 A * | 1/1950 | Schaefer ................. B24D 3/34 501/75 |
| 3,913,281 A | 10/1975 | Jones |
| 4,623,364 A | 11/1986 | Cottringer et al. |
| 4,898,597 A | 2/1990 | Hay et al. |

(Continued)

FOREIGN PATENT DOCUMENTS

| CN | 105102158 A | 11/2015 |
| CN | 108883519 A | 11/2018 |

(Continued)

OTHER PUBLICATIONS

Espacenet Machine Translation of JP 2012200847 (Year: 2025).*

(Continued)

*Primary Examiner* — Alexandra M Moore
(74) *Attorney, Agent, or Firm* — Abel Schillinger, LLP; Arpan Ghosh

(57) ABSTRACT

An abrasive article can include a body including abrasive particles contained in the body and ceramic particles contained within a bond material. The ceramic particles can have an average particle size D50c of at least 2 microns and at most 75 microns. The abrasive particles can include an average particle size D50a greater than the average particle size D50c.

14 Claims, 17 Drawing Sheets

(56) References Cited

U.S. PATENT DOCUMENTS

| | | | |
|---|---|---|---|
| 5,256,603 A * | 10/1993 | Andrus | C03C 14/004 |
| | | | 51/308 |
| 5,840,090 A | 11/1998 | Ho et al. | |
| 5,876,470 A | 3/1999 | Abrahamson | |
| 6,056,794 A | 5/2000 | Stoetzel et al. | |
| 6,080,216 A | 6/2000 | Erickson | |
| 6,086,467 A | 7/2000 | Imai et al. | |
| 8,257,152 B2 | 9/2012 | Wank et al. | |
| 8,475,553 B2 | 7/2013 | Orlhac et al. | |
| 9,539,701 B2 | 1/2017 | Sarangi et al. | |
| 10,493,595 B2 | 12/2019 | Deleuze et al. | |
| 2003/0213182 A1 | 11/2003 | Knapp et al. | |
| 2008/0222965 A1* | 9/2008 | Querel | B24D 3/06 |
| | | | 51/308 |
| 2008/0222967 A1 | 9/2008 | Querel et al. | |
| 2008/0293345 A1 | 11/2008 | Bright et al. | |
| 2009/0088056 A1 | 4/2009 | Takehara et al. | |
| 2012/0122381 A1 | 5/2012 | Wank et al. | |
| 2015/0033636 A1 | 2/2015 | Li et al. | |
| 2015/0291865 A1 | 10/2015 | Breder et al. | |
| 2015/0291866 A1 | 10/2015 | Arcona et al. | |
| 2015/0291867 A1 | 10/2015 | Breder et al. | |
| 2016/0023328 A1 | 1/2016 | Flaschberger et al. | |
| 2016/0151885 A1 | 6/2016 | Sarangi et al. | |
| 2016/0214233 A1 | 7/2016 | Kasuga et al. | |
| 2017/0246726 A1 | 8/2017 | Ramanath et al. | |
| 2018/0133866 A1 | 5/2018 | Sarangi et al. | |
| 2019/0100683 A1 | 4/2019 | Sarangi et al. | |

FOREIGN PATENT DOCUMENTS

| | | | |
|---|---|---|---|
| CN | 110193788 A | | 9/2019 |
| JP | S49-005717 B | | 2/1974 |
| JP | S5013991 B2 | | 5/1975 |
| JP | S529873 B2 | | 3/1977 |
| JP | S54-039292 A | | 3/1979 |
| JP | S60-085869 A | | 5/1985 |
| JP | S63-256365 A | | 10/1988 |
| JP | H06226636 A | | 8/1994 |
| JP | H07-096464 A | | 4/1995 |
| JP | 2567475 B2 | | 12/1996 |
| JP | H11-019875 A | | 1/1999 |
| JP | 2012200847 A | * | 10/2012 |
| JP | 2016137536 A | | 8/2016 |
| JP | 6279108 B2 | | 2/2018 |
| JP | 2018502724 A | | 2/2018 |
| KR | 20150131077 A | | 11/2015 |
| WO | 2017044404 A1 | | 3/2017 |

OTHER PUBLICATIONS

International Search Report and Written Opinion for PCT/US2020/060545, dated Feb. 24, 2021.
Media Blast & Abrasive, Inc.: "Git size conversion chart", 2016, Retrieved from the Internet: URL: https ://mediablast. com/grit-size-conversion-chart/ [retrieved on Nov. 8, 2023].
Japan Standards Association, JIS Handbook 5 Tools, "JIS B4130 Diamond/CBN products—Grain sizes of diamond or cubic boron nitride", Jun. 22, 2009, First Edition, 13 pages (English translation).

* cited by examiner

ABRASIVE ARTICLES AND METHODS FOR FORMING SAME

CROSS-REFERENCE TO RELATED APPLICATION(S)

This application claims priority to Chinese Patent Application No. 201911126711.2, entitled "ABRASIVE ARTICLES AND METHODS FOR FORMING SAME," by Daming ZHANG et al., filed Nov. 15, 2019, which is assigned to the current assignee hereof and incorporated herein by reference in its entirety.

FIELD OF THE DISCLOSURE

The following is directed to abrasive article including abrasive particles and bond material, and particularly, to abrasive article including abrasive particles and ceramic particles contained in the bond material.

DESCRIPTION OF THE RELATED ART

Abrasive articles are used in material removal operations, such as cutting, grinding, or shaping various materials. Fixed abrasive articles include abrasive particles held in a bond material. The bond material can include an organic and/or inorganic material. The industry continues to demand improved abrasive articles.

SUMMARY OF INVENTION

In some examples, the subject application relates to an abrasive article, comprising: a body including: a bond material extending through at least a portion of the body; abrasive particles contained in the body, the abrasive particles having an average particle size (D50a) of at least 100 microns; and ceramic particles contained in the bond material, wherein the ceramic particles comprise an average particle size (D50c) of at least 2 microns and at most 75 microns.

In some examples, the subject application also relates to an abrasive article, comprising: a body including: a bond material comprising a vitreous phase; abrasive particles contained in the body, the abrasive particles having an average abrasive particle size (D50a); and ceramic particles contained in the bond material, wherein the ceramic particles comprise an average particle size (D50c); wherein the bond material comprises an average bond post size (Sbp) and wherein D50c<Sbp<D50a.

In some examples, the subject application relates to an abrasive article, comprising: a body including: a bond material comprising a vitreous phase; abrasive particles contained in the body, the abrasive particles having an average abrasive particle size (D50a); and pores surrounded by ceramic particles contained in the bond material, wherein the ceramic particles comprise an average particle size (D50c), wherein D50c<D50a.

BRIEF DESCRIPTION OF THE DRAWINGS

The present disclosure may be better understood, and its numerous features and advantages made apparent to those skilled in the art by referencing the accompanying drawings.

Figure 1:
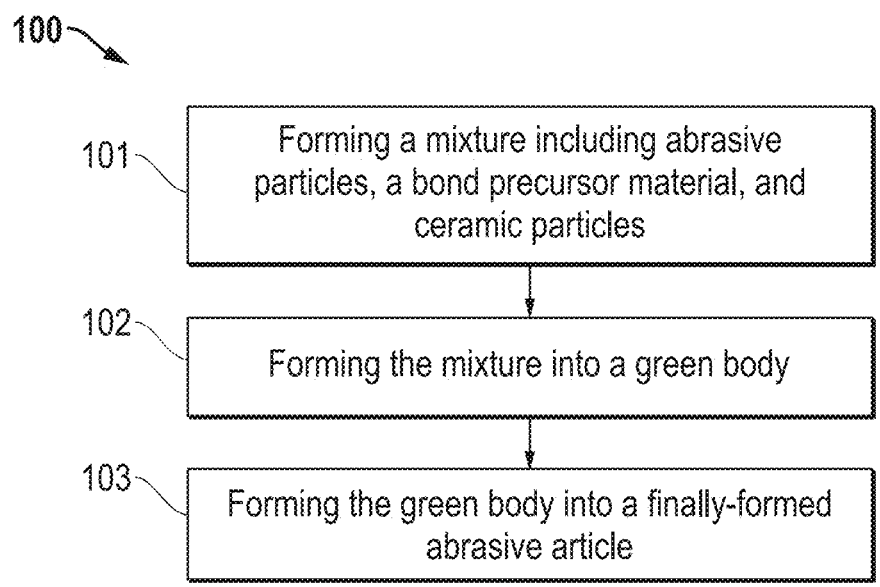
FIG. 1 includes a flowchart illustrating a forming process according to an embodiment.
Figure 2:
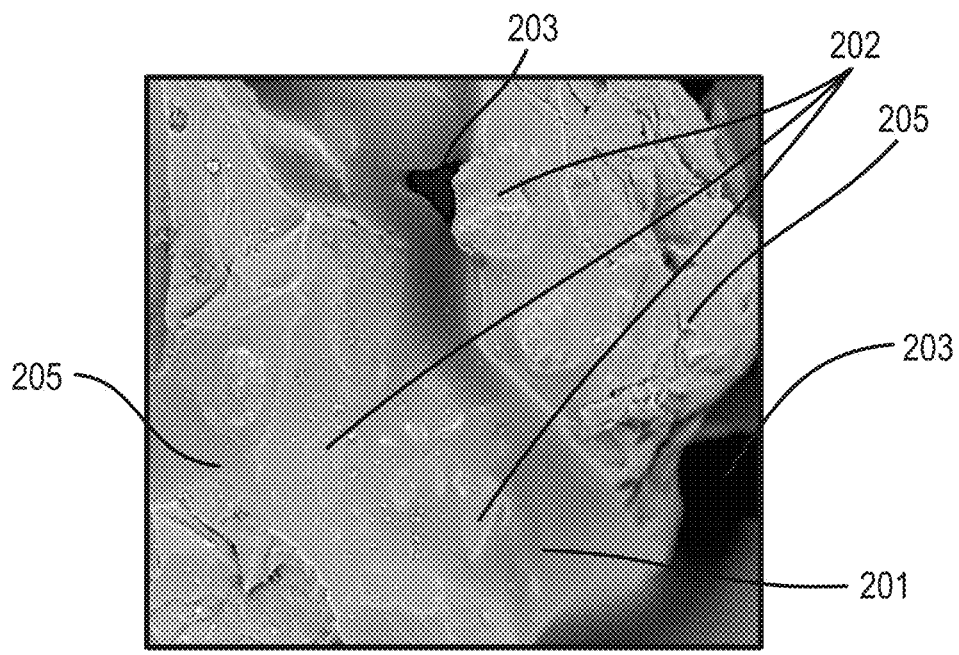
FIG. 2 includes a cross-sectional image of a portion of an abrasive article according to an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings provided herein. The following disclosure will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments are directed to abrasive articles including a body including a bond material and abrasive particles contained in the body. The body further includes ceramic particles contained in the bond material. The ceramic particles are different from the abrasive particles. For instance, the ceramic particles can have an average particle size (D50c) smaller than the average particle size of the abrasive particles (D50a). The abrasive articles described in embodiments herein can include fixed abrasive articles including, such as, bonded abrasive articles. The abrasive articles can have improved performance and properties, such as power draw, wear rate, and G-Ratio, compared to conventional abrasive articles.

FIG. 1 includes a flowchart illustrating a process 100 for forming an abrasive article according to an embodiment. As illustrated, at step 101, the process can be initiated by forming a mixture including abrasive particles, a bond precursor material, and ceramic particles.

The bond precursor material may include a powder material that may form the bond material of the finally-formed abrasive particle. In one embodiment, the bond precursor material can include a frit. The bond precursor material can include an inorganic material, such as a ceramic material. As used herein, a reference to a ceramic can include a composition including at least one metal element and at least one non-metal element. For example, a ceramic may include material such as oxides, carbides, nitrides, borides, and a combination thereof. More particularly, a ceramic material may have a vitreous phase, crystalline phase, polycrystalline phase, and a combination thereof.

The bond precursor material can include an oxide-based composition, which may include some content of silica (i.e., silicon dioxide), boron oxide, alumina (i.e., aluminum oxide), zircon, sodium oxide, potassium oxide, iron oxide, titanium oxide, magnesium oxide, calcium oxide, and the like. Contents of the bond material of the finally-formed bonded abrasive body are disclosed in more details hereinafter. In some instances, contents of components in the bond precursor material may be different from contents of components in the finally formed bonded abrasive body due to loss on ignition. For instance, the content of component in the precursor bond material may be calculated by using the formula $C=C_F(100\%-P_{LOI})$, wherein C is the content of a component in the bond precursor, CF is the content of the component in the finally-formed bonded abrasive body, and $P_{LOI}$ is loss of ignition. In further instances, the composition of the bond precursor material and the bond material of the finally-formed bonded abrasive body can be substantially the same (i.e., 5% or less difference in any one of the components between the precursor bond material and bond material of the finally-formed bonded abrasive body) or essentially the same (i.e., 1% or less difference in any one of the components between the precursor bond material and bond material of the finally-formed bonded abrasive body).

In an embodiment, the ceramic particles can include a particular particle size distribution that can facilitate improved performance and property of the ceramic particles. In an aspect, the ceramic particles can have a particular average particle size D50c that can facilitate improved performance and properties of the abrasive article. In this disclosure, average particle size (D50), D10, and D90 of particles can be determined by using laser diffraction particle size analysis of at least 1 g of discrete particles. In an example, the ceramic particles can include the average particle size (D50c) of at least 2 microns, at least 4 microns, at least 6 microns, at least 7 microns, at least 8 microns, at least 9 microns, at least 10 microns, at least 11 microns, or at least 12 microns. In a further example, the ceramic particles can include the average particle size (D50c) of greater than 12 microns, at least 13 microns, at least 14 microns, at least 15 microns, at least 16 microns, at least 17 microns, at least 18 microns, at least 19 microns, at least 20 microns, at least 21 microns, at least 22 microns, at least 23 microns, at least 24 microns, at least 25 microns, at least 26 microns, at least 37 microns, at least 38 microns, at least 39 microns, at least 40 microns, at least 41 microns, at least 42 microns, at least 43 microns, at least 44 microns, at least 45 microns, at least 46 microns, at least 47 microns, at least 48 microns, at least 49 microns, at least 50 microns, at least 51 microns, at least 52 microns, at least 53 microns, at least 54 microns, at least 55 microns, at least 56 microns, at least 57 microns, at least 58 microns, at least 59 microns, at least 60 microns, at least 61 microns, at least 62 microns, at least 63 microns, at least 64 microns, at least 65 microns, at least 66 microns, at least 67 microns, at least 68 microns, at least 69 microns, or at least 70 microns. In another example, the ceramic particles can include the average particle size (D50c) of at most 90 microns, at most 85 microns, at most 80 microns, at most 75 microns, at most 74 microns, at most 73 microns, at most 72 microns, at most 71 microns, at most 70 microns, at most 69 microns, at most 68 microns, at most 67 microns, at most 66 microns, at most 65 microns, at most 64 microns, at most 63 microns, at most 62 microns, at most 61 microns, at most 60 microns, at most 59 microns, at most 58 microns, at most 57 microns, at most 56 microns, at most 55 microns, at most 54 microns, at most 53 microns, at most 52 microns, at most 51 microns, at most 50 microns, at most 49 microns, at most 48 microns, at most 47 microns, at most 46 microns, at most 45 microns, at most 44 microns, at most 43 microns, at most 42 microns, at most 41 microns, at most 40 microns, at most 39 microns, at most 38 microns, at most 37 microns, at most 36 microns, at most 35 microns, at most 34 microns, at most 33 microns, at most 32 microns, at most 31 microns, at most 30 microns, at most 29 microns, at most 28 microns, at most 27 microns, at most 26 microns, at most 25 microns, at most 24 microns, at most 23 microns, or at most 22 microns. Moreover, the average particle size of the ceramic particles D50c can be in a range including any of the minimum and maximum values noted above. For instance, the ceramic particles can include the average particle size (D50c) in a range greater than 12 microns to 75 microns, in a range from 13 microns to 70 microns, in a range from 15 microns to 55 microns, in a range from 17 microns to 45 microns, in a range from 20 microns to 42 microns, or in a range from 22 microns to 38 microns.

In another aspect, the ceramic particles may have a particular D10 that may define the maximum particle size of the particles in the lowest 10% of the distribution (i.e., the particle size of the abrasive particles in the $10^{th}$ percentile of the distribution). For example, the ceramic particles can include a particle size distribution including a D10 of at least 1 micron, at least 2 microns, at least 3 microns, at least 5 microns, at least 5.5 microns, at least 6 microns, at least 6.5 microns, at least 7 microns, at least 7.5 microns, at least 8 microns, at least 8.3 microns, at least 8.5 microns, at least 8.8 microns, at least 9 microns, at least 9.2 microns, at least 9.4 microns, at least 9.6 microns, at least 9.8 microns, at least 10 microns, at least 10.5 microns, at least 10.8 microns, at least 11 microns, at least 11.3 microns, at least 11.5 microns, at least 11.8 microns, or at least 12 microns. In another example, the ceramic particles can include a D10 of at most 38 microns, at most 35 microns, at most 33 microns, at most 31 microns, at most 30 microns, at most 28 microns, at most 27 microns, at most 25 microns, at most 23 microns, at most 20 microns, at most 18 microns, at most 16 microns, at most 14 microns, or at most 13 microns. It will be appreciated that the ceramic particles can have a D10 within a range including any of the minimum and maximum values noted above.

The ceramic particles may also have a particular D90 that may define the minimum particle size of the particles in the greatest 10% of the distribution (i.e., the particle size for the abrasive particles in the 90$^{th}$ percentile of the distribution). In an example, the ceramic particles can include D90 of at least 15 microns, at least 17 microns, at least 19 microns, at least 20 microns, at least 22 microns, at least 23 microns, at least 24 microns, at least 27 microns, at least 29 microns, at least 30 microns, at least 31 microns, at least 33 microns, at least 35 microns, at least 37 microns, at least 38 microns, at least 40 microns, at least 41 microns, or at least 42 microns. In another example, the ceramic particles can include D90 of at most 120 microns, at most 110 microns, at most 100 microns, at most 90 microns, at most 88 microns, at most 85 microns, at most 83 microns, at most 80 microns, at most 78 microns, at most 76 microns, at most 74 microns, at most 72 microns, at most 70, microns, at most 68 microns, at most 66 microns, at most 64 microns, at most 62 microns, at most 60, microns, at most 58 microns, at most 56 microns, at most 54 microns, at most 52 microns, at most 50 microns, at most 48 microns, at most 46 microns, at most 45 microns, at most 44 microns, or at most 43 microns. It will be appreciated that the ceramic particles can have a D90 within a range including any of the minimum and maximum values noted above.

In a further aspect, the ceramic particles can include a crystalline material, an amorphous material, or a combination thereof. In a particular aspect, the ceramic particles can include a polycrystalline material having a particular average crystallite size that can facilitate improved properties and performance of the abrasive articles. For instance, the average crystallite size can be at least 0.005 microns, at least 0.01 microns, at least 0.02 microns, at least 0.03 microns, at least 0.04 microns, at least 0.05 microns, at least 0.06 microns, at least 0.07 microns, at least 0.08 microns, at least 0.09 microns, at least 0.1 microns, at least 0.11 microns, at least 0.12 microns, at least 0.13 microns, at least 0.14 microns, at least 0.15 microns, at least 0.16, at least 0.17 microns, at least 0.18 microns, at least 0.19 microns, at least 0.2 microns, at least 0.3 microns, at least 0.4 microns, at least 0.5 microns, at least 0.6, at least 0.7 microns, at least 0.8 microns, at least 0.9 microns, at least 1 microns, at least 1.3 microns, at least 1.5 microns, at least 1.8 microns, at least 2 microns, at least 3 microns, at least 4 microns, or at least 5 microns. In another instance, the ceramic particles can include a polycrystalline material having an average crystallite size of at most 75 microns, at most 60 microns, at most 50 microns, at most 40 microns, at most 30 microns, at most 20 microns, at most 10 microns, at most 9 microns, at most 8 microns, at most 7 microns, at most 6 microns, at most 5 microns, at most 4 microns, at most 3 microns, at most 2 microns, at most 1.5 microns, at most 1 microns, at most 0.9 microns, at most 0.8 microns, at most 0.7 microns, at most 0.6 microns, at most 0.5 microns, at most 0.4 microns, at most 0.3 microns, at most 0.2 microns, at most 0.1 microns, at most 0.09 microns, at most 0.08 microns, at most 0.07 microns, at most 0.06 microns, at most 0.05 microns, at most 0.04 microns, at most 0.03 microns, at most 0.02 microns, or at most 0.01 microns. Moreover, the ceramic particles can include a polycrystalline material having an average crystallite size in a range including any of the minimum and maximum values noted herein.

In a further aspect, the ceramic particles can include a material including an oxide, a carbide, a nitride, borides, oxycarbides, oxynitrides, silicates, or any combination thereof. In a particular example, the ceramic particles can include silicon dioxide, silicon carbide, alumina, zirconia, rare earth-containing materials, cerium oxide, sol-gel derived particles, iron oxide, glass-containing particles, and a combination thereof. In another aspect, the ceramic particles can include the same material as the abrasive particles. In another aspect, the ceramic particles can include a different material than the abrasive particles. In a particular example, the ceramic particles can include alumina, such as fused alumina, sol-gel alumina, microcrystalline alumina, nanocrystalline alumina, or any combination thereof. For instance, the ceramic particles can include fused alumina. In another instance, the ceramic particles can include white alumina, pink alumina, or a combination thereof. In a particular implementation, the ceramic particles can consist essentially of fused alumina particles. In an even more particular implementation, the ceramic particles can consist essentially of white fused alumina. In another particular instance, the ceramic particles can include alpha-alumina, or more particularly, consist essentially of alpha-alumina.

In an aspect, the ceramic particles can include a particular Mohs's hardness that can facilitate improved performance and properties of abrasive particles. For instance, the ceramic particles can include a Mohs' hardness of at least 5.5, at least 6, at least 6.5, at least 7, at least 7.5, at least 8, at least 8.5, or at least 9. In another instance, the ceramic particles can include a Mohs' hardness of at most 10, at most 9.5, at most 9, at most 8.5, at most 8, at most 7.5, or at most 7. Moreover, the ceramic particles can include a Mohs's hardness in a range including any of the minimum and maximum values noted herein.

The mixture can include a particular content of the ceramic particles that can facilitate improved performance and properties of the abrasive article. In one embodiment, the content of the ceramic particles can be in volume percentages. As used herein, the volume percentage of ceramic particles included in the mixture, $V_{c/p}$, can be determined by using the formula $V_{c/p}=[V_{cm}/(V_{cm}+V_{bpm})]\times 100\%$, wherein $V_{cm}$ is the volume of ceramic particles added to the mixture and $V_{bpm}$ is the volume of the bond precursor material added to the mixture. In an aspect, the content of the ceramic particles $V_{c/p}$ can be at least 1 vol %, such as at least 1.3 vol %, at least 1.5 vol %, at least 1.8 vol %, at least 2 vol %, at least 2.2%, at least 2.5 vol %, at least 2.7 vol %, at least 3 vol %, at least 3.3 vol %, at least 3.5 vol %, at least 3.7 vol %, at least 3.9 vol %, at least 4 vol %, at least 4.1 vol %, at least 4.3 vol %, at least 4.5 vol %, at least 4.7 vol %, at least 4.9 vol %, at least 5 vol %, at least 6 vol %, or at least 7 vol %. In another aspect, the content of the ceramic particles $V_{c/p}$ can be at most 15 vol %, such as at most 12 vol %, at most 11 vol %, or at most 10 vol %. In certain aspect, the content of the ceramic particles $V_{c/p}$ can be less than 10 vol %, such as at most 9.7 vol %, at most 9.5 vol %, at most 9.4 vol %, at most 9.2 vol %, at most 9 vol %, at most 8.8 vol %, at most 8.6 vol %, at most 8.3 vol %, at most 8 vol %, at most 7.9 vol %, at most 7.7 vol %, at most 7.5 vol %, at most 7.3 vol %, at most 7 vol %, at most 6.9 vol %, at most 6.7 vol %, at most 6.6 vol %, at most 6.4 vol %, at most 6.2 vol %, at most 6 vol %, at most 5.8 vol %, at most 5.6 vol %, at most 5.4 vol %, at most 5.2 vol %, at most 5 vol %, at most 4.8 vol %, or at most 4.6 vol %. Moreover, the content of the ceramic particles $V_{c/p}$ can be in a range including any of the minimum and maximum percentages noted herein.

In another embodiment, the content of the ceramic particles included in the mixture can be in weight percentages. As used herein, the weight percentage of ceramic particles included in the mixture, $W_{c/p}$, can be determined by using the formula $W_{c/p}=[W_{cm}/(W_{cm}\pm W_{bpm})]\times 100\%$, wherein $W_{cm}$ is the weight of ceramic particles added to the mixture and $W_{bpm}$ is the weight of the bond precursor material added to the mixture. In an aspect, the content of the ceramic particles $W_{c/p}$ can be at least 0.001 wt %, such as at least 0.01 wt %, at least 0.05 wt %, at least 0.08 wt %, at least 0.1 wt %, at least 0.2 wt %, at least 0.4 wt %, at least 0.5 wt %, at least 0.7 wt %, at least 0.8 wt %, at least 0.9 wt %, at least 1 wt %, at least 1.2 wt %, at least 1.4 wt %, at least 1.6 wt %, at least 1.8 wt %, at least 2 wt %, at least 2.2 wt %, at least 2.5 wt %, at least 2.7 wt %, at least 3 wt %, at least 3.3 wt %, at least 3.5 wt %, at least 3.7 wt %, at least 3.9 wt %, at least 4 wt %, at least 4.1 wt %, at least 4.3 wt %, at least 4.5 wt %, at least 4.7 wt %, at least 4.9 wt %, at least 5 wt %, at least 7 wt %, at least 9 wt %, at least 10 wt %, at least 12 wt %, at least 15 wt %, at least 17 wt %, at least 19 wt %, at least 20 wt %, at least 22 wt %, at least 25 wt %, at least 28 wt %, or at least 30 wt %. In another aspect, the content of the ceramic particles $W_{c/p}$ can be less than 50 wt %, such as at most 45 wt %, at most 43 wt %, at most 41 wt %, at most 39 wt %, at most 37 wt %, at most 35 wt %, at most 33 wt %, at most 31 wt %, at most 28 wt %, at most 26 wt %, at most 24 wt %, at most 22 wt %, at most 20 wt %, at most 17 wt %, at most 15 wt %, at most 13 wt %, at most 11 wt %, at most 10 wt %, at most 9.7 wt %, at most 9.5 wt %, at most 9.4 wt %, at most 9.2 wt %, at most 9 wt %, at most 8.8 wt %, at most 8.6 wt %, at most 8.3 wt %, at most 8 wt %, at most 7.9 wt %, at most 7.7 wt %, at most 7.5 wt %, at most 7.3 wt %, at most 7 wt %, at most 6.9 wt %, at most 6.7 wt %, at most 6.6 wt %, at most 6.4 wt %, at most 6.2 wt %, at most 6 wt %, at most 5.8 wt %, at most 5.6 wt %, at most 5.4 wt %, at most 5.2 wt %, at most 5 wt %, at most 4.8 wt %, at most 4.6 wt %, at most 4.1 wt %, at most 3.9 wt %, at most 3.5 wt %, at most 3.3 wt %, at most 3 wt %, at most 2.7 wt %, at most 2.5 wt %, at most 2.2 wt %, at most 2 wt %, at most 1.5 wt %, or at most 1 wt %. Moreover, the content of the ceramic particles $W_{c/p}$ can be in a range including any of the minimum and maximum percentages noted herein.

The abrasive particles can include a material including a naturally occurring material, a synthetic material, a monocrystalline material, a polycrystalline material, an amorphous material, or a combination thereof. In a particular example, the abrasive particle can include at least one material selected from an oxide, a carbide, a nitride, a boride, a carbon-based materials (e.g., diamond), an oxycarbides, an oxynitrides, an oxyborides, superabrasives, minerals, and any combination thereof. The abrasive particle can have certain Mohs hardness, such as at least 6, at least 6.5, at least 7, at least 8, at least 8.5, at least 9, or at least 9.5.

In a more particular example, the abrasive particles can include a material selected from the group of silicon dioxide, silicon carbide, alumina, zirconia, flint, garnet, emery, rare earth oxides, rare earth-containing materials, cerium oxide, sol-gel derived particles, gypsum, iron oxide, glass-containing particles, and a combination thereof. In a more particular instance, the abrasive particles may include silicon carbide, brown fused alumina, seeded gel abrasive, sintered alumina with additives, shaped and sintered aluminum oxide, pink alumina, ruby alumina, electrofused monocrystalline alumina, alumina zirconia, extruded bauxite, cubic boron nitride, diamond, aluminum oxynitride, sintered alumina, extruded alumina, or any combination thereof.

In an exemplary implementation, the abrasive particles can include a ceramic material including alumina ($Al_2O_3$), magnesia (MgO), zirconia ($ZrO_2$), chromium oxide ($Cr_2O_3$), or any combination thereof. Particularly, the abrasive particles can include at least 50 wt % of alumina for a total weight of the abrasive particles, such as at least 60 wt %, at least 80 wt %, or at least 90 wt %. In a more particularly instance, the abrasive particles can consist essentially of alumina. In another instance, the abrasive particles can include monocrystalline alumina. In a further instance, the abrasive particles can include aluminum oxynitride. In still another instance, the abrasive particles can include silicon carbide.

Another example of abrasive particles can include agglomerates, aggregates, shaped abrasive particles, non-agglomerated particles, non-shaped abrasive particles, or any combination thereof. In a particular example, the abrasive particles can include agglomerated white alumina particles.

Shaped abrasive particles are formed such that each particle has substantially the same arrangement of surfaces and edges relative to each other for shaped abrasive particles having the same two-dimensional and three-dimensional shapes. As such, shaped abrasive particles can have a high shape fidelity and consistency in the arrangement of the surfaces and edges relative to other shaped abrasive particles of the group having the same two-dimensional and three-dimensional shape. By contrast, non-shaped abrasive particles can be formed through different process and have different shape attributes. For example, non-shaped abrasive particles are typically formed by a comminution process, wherein a mass of material is formed and then crushed and sieved to obtain abrasive particles of a certain size. However, a non-shaped abrasive particle will have a generally random arrangement of the surfaces and edges, and generally will lack any recognizable two-dimensional or three dimensional shape in the arrangement of the surfaces and edges around the body. Moreover, non-shaped abrasive particles of the same group or batch generally lack a consistent shape with respect to each other, such that the surfaces and edges are randomly arranged when compared to each other. Therefore, non-shaped grains or crushed grains have a significantly lower shape fidelity compared to shaped abrasive particles.

In some implementations, the abrasive particles can include shaped abrasive particles. For instance, shaped abrasive particles can include those disclosed in US 20150291865, US 20150291866, and US 20150291867, which are incorporated herein in their entireties. In another instance, the shaped abrasive particles can include a two dimensional shape selected from the group consisting of regular polygons, irregular polygons, irregular shapes, triangles, partially-concave triangles, quadrilaterals, rectangles, trapezoids, pentagons, hexagons, heptagons, octagons, ellipses, Greek alphabet characters, Latin alphabet characters, Russian alphabet characters, and a combination thereof. In another instance, the shaped abrasive particles can include a three-dimensional shape selected from the group consisting of a polyhedron, a pyramid, an ellipsoid, a sphere, a prism, a cylinder, a cone, a tetrahedron, a cube, a cuboid, a rhombohedrum, a truncated pyramid, a truncated ellipsoid, a truncated sphere, a truncated cone, a pentahedron, a hexahedron, a heptahedron, an octahedron, a nonahedron, a decahedron, a Greek alphabet letter, a Latin alphabet character, a Russian alphabet character, a Kanji character, complex polygonal shapes, irregular shaped contours, a volcano shape, a monostatic shape, and a combination thereof, a monostatic shape is a shape with a single stable resting position. In still another instance, the shaped abrasive particles can include a triangular two-dimensional shape, a partially-concave triangular two-dimensional shape, or a combination thereof.

In a further example, the shaped abrasive particle can include body having a body length (Lb), a body width (Wb), and a body thickness (Tb), and wherein Lb>Wb, Lb>Tb, and Wb>Tb. The body can include a primary aspect ratio (Lb:Wb) of at least about 1:1 or at least about 2:1 or at least about 3:1 or at least about 5:1 or at least about 10:1, and at most 1000:1. The body may also include a secondary aspect ratio (Lb:Tb) of at least about 1:1 or at least about 2:1 or at least about 3:1 or at least about 5:1 or at least about 10:1, and at most 1000:1. The body can include a tertiary aspect ratio (Wb:Tb) of at least about 1:1 or at least about 2:1 or at least about 3:1 or at least about 5:1 or at least about 10:1, and at most 1000:1. In further instances, at least one of the body length (Lb), the body width (Wb), and the body thickness (Tb) can have an average dimension of at least 0.1 microns or at least 1 micron or at least 10 microns or at least 50 microns or at least 100 microns or at least 150 microns or at least 200 microns or at least 400 microns or at least 600 microns or at least 800 microns or at least 1 mm, and at most 20 mm or at most 18 mm or at most 16 mm or at most 14 mm or at most 12 mm or at most 10 mm or at most 8 mm or at most 6 mm or at most 4 mm. In a further instance, the body comprises a cross-sectional shape in a plane defined by the body length and the body width selected from the group consisting of triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof.

In a particular implementation, the mixture can include a blend including a first type of abrasive particles and a second type of abrasive particles. The first and second types of abrasive particles can independently include any of the abrasive particles noted in embodiments herein. For instance, the first type abrasive particles can include a ceramic material, and a second type of abrasive particles can include a monocrystalline material. In another instance, the first type of abrasive particles can include non-agglomerated particles, and a second type of abrasive particles can include agglomerated particles.

The abrasive particles can include a particular particle size distribution. In an embodiment, abrasive particles can have a particular average particle size D50a that can facilitate improved properties and performance of the abrasive article. In an aspect, the average particle size D50a can be at most 1.9 mm, at most 1.8 mm, at most 1.6 mm, at most 1.5 mm, at most 1.2 mm, at most 1 mm, at most 900 microns, at most 850 microns, at most 830 microns, at most 800 microns, at most 750 microns, at most 700 microns, at most 650 microns, at most 600 microns, at most 550 microns, at most 500 microns, at most 450 microns, at most 400 microns, at most 380 microns, at most 350 microns, at most 320 microns, at most 300 microns, at most 280 microns, at most 260 microns, or at most 255 microns. In another aspect, the average particle size D50a can be at least 120 microns, at least 140 microns, at least 150 microns, at least 170 microns, at least 180 microns, at least 200 microns, at least 210 microns, at least 230 microns, at least 250 microns, at least 260 microns, at least 270 microns, at least 290 microns, at least 300 microns, at least 320 microns, at least 340 microns, at least 350 microns, at least 360 microns, at least 380 microns, at least 400 microns, at least 420 microns, at least 430 microns, at least 440 microns, at least 450 microns, at least 460 microns, at least 470 microns, at least 490 microns, or at least 500 microns. Moreover, the particle size D50a can be in a range including any of the minimum and maximum values noted herein.

In a further embodiment, the abrasive particles can have a particular D10 that can facilitate improved properties and performance of the abrasive article. In an aspect, the abrasive particles can include a D10 of at least 60 microns, at least 65 microns, at least 70 microns, at least 75 microns, at least 80 microns, at least 85 microns, at least 90 microns, at least 95 microns, at least 100 microns, at least 110 microns, at least 120 microns, at least 130 microns, at least 135 microns, at least 140 microns, at least 145 microns, at least 150 microns, at least 155 microns, at least 160 microns, or at least 165 microns. In a further aspect, the abrasive particles can include a D10 of at most 1 mm, at most 900 microns, at most 850 microns, at most 830 microns, at most 800 microns, at most 750 microns, at most 700 microns, at most 650 microns, at most 600 microns, at most 550 microns, at most 500 microns, at most 450 microns, at most 400 microns, at most 380 microns, at most 350 microns, at most 320 microns, at most 300 microns, at most 280 microns, at most 260 microns, at most 250 microns, at most 240 microns, at most 220 microns, at most 210 microns, at most 200 microns, or at most 170 microns. Moreover, the abrasive particles can include a D10 in a range including any of the minimum and maximum values noted herein.

In a further embodiment, the abrasive particles can have a particular D90 that can facilitate improved properties and performance of the abrasive article. In an aspect, the abrasive particles can include a D90 of at least 150 microns, at least 170 microns, at least 190 microns, at least 200 microns, at least 220 microns, at least 240 microns, at least 250 microns, at least 260 microns, at least 270 microns, at least 280 microns, at least 300 microns, at least 310 microns, at least 320 microns, at least 340 microns, at least 350 microns, at least 360 microns, or at least 370 microns. In a further aspect, the abrasive particles can include a D90 of at most 2.2 mm, at most 2 mm, at most 1 mm, at most 900 microns, at most 870 microns, at most 850 microns, at most 820 microns, at most 780 microns, at most 750 microns, at most 730 microns, at most 700 microns, at most 670 microns, at most 640 microns, at most 610 microns, at most 580 microns, at most 530 microns, at most 500 microns, at most 470 microns, at most 450 microns, at most 330 microns, at most 410 microns, at most 390 microns, or at most 370 microns. Moreover, the abrasive particles can include a D90 in a range including any of the minimum and maximum values noted herein.

In a further embodiment, the abrasive particles can have an average aspect ratio of length:width. In an aspect, the average aspect ratio can be at least 1, at least 1.2, at least 1.5, at least 2, at least 2.3, at least 2.5, at least 2.8, at least 3, at least 4, at least 5, or at least 6. In another aspect, the average aspect ratio can be at most 30, at most 25, at most 22, at most 20, at most 15, at most 12, at most 10, at most 8, at most 6, at most 5, at most 4, or at most 3. Moreover, the abrasive particles can have an aspect ratio in a range including any of the minimum and maximum values noted herein.

The mixture can optionally include one or more filler materials. The filler material may provide improved mechanical properties and facilitate formation of the abrasive article. The filler material can be distinct from the abrasive particles and distinct from the ceramic particles. For instance, the filler material may have a hardness less than a hardness of the abrasive particles and less than a hardness of the ceramic particles. The filler material may also be distinct from compositions contained within bond precursor material. In at least one embodiment, the filler material can include various materials, such as fibers, woven materials, non-woven materials, particles, minerals, nuts, shells, oxides, alumina, carbide, nitrides, borides, organic materials, polymeric materials, naturally occurring materials, and a combination thereof. In particular instances, the filler material can include a material such as wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), cryolite, glass, glass fibers, titanates (e.g., potassium titanate fibers), zircon, rock wool, clay, sepiolite, an iron sulfide (e.g., $Fe_2S_3$, $FeS_2$, or a combination thereof), fluorspar ($CaF_2$), potassium sulfate ($K_2SO_4$), graphite, potassium fluoroborate ($KBF_4$), potassium aluminum fluoride ($KAlF_4$), zinc sulfide (ZnS), zinc borate, borax, boric acid, fine alundum powders, P15A, bubbled alumina, cork, glass spheres, silver, Saran™ resin, paradichlorobenzene, oxalic acid, alkali halides, organic halides, and attapulgite.

Formation of the mixture can include forming a dry or wet mixture. It may be suitable to create a wet mixture to facilitate homogenous dispersion of the components within the mixture. In some implementations, a pre-mixture of the bond precursor material and ceramic particles may be prepared such that a homogenous bond precursor composition can be made for mixing with other components of the mixture. In other instances, ceramic particles, abrasive particles, and/or other components can be mixed with the bond precursor material without forming the pre-mixture. A skilled artisan will appreciate that the mixture can include other materials, including for example a filler, additives, binders, a pore former, hollow particles, or any other materials known in the art to facilitate formation of a mixture to create a green product prior to formation of the abrasive article. In at least one embodiment, the mixture can be essentially free of a pore former.

After reading this disclosure, a skilled artisan will appreciate the ceramic particles and the bond precursor material make up the bond component in the mixture, and the ceramic particles are not intended to substitute a portion of abrasive particles.

Referring again to FIG. 1, after forming the mixture, the process can continue at step 102 forming the mixture into a green body. The process of forming the mixture into a green body can include pressing, molding, casting, cutting, printing, curing, depositing, drying, heating, cooling, or any combination thereof.

Referring again to FIG. 1, after forming the green body at step 102, the process can continue at step 103 by forming the green body into the finally-formed abrasive article. In certain instances, the process of forming the green body and the process for forming the finally-formed abrasive article can be combined, such that the mixture is converted directly to the finally-formed abrasive article. Suitable processes for forming the finally-formed abrasive article can include pressing, molding, casting, cutting, printing, curing, depositing, drying, heating, cooling, or any combination thereof.

In one particular embodiment, the process for forming the finally-formed abrasive article can include heat treating the mixture. In accordance with an embodiment, the process of heat treating can include heating the mixture to a temperature sufficient to form a vitreous bond material from the bond precursor material. In accordance with an embodiment, heat treating can include heating the mixture to a forming temperature of not greater than 1250° C., such as not greater than 1200° C., not greater than 1150° C., not greater than 1100° C., not greater than 1050° C., or even not greater than 950° C. Still, in at least one non-limiting embodiment, the process of heat treating can include heating the mixture including abrasive particles, ceramic particles, and bond material to a forming temperature of at least 850° C., such as at least 875° C., at least 900° C., at least 920° C., or even at least 950° C. It will be appreciated that the forming temperature can be within a range including any of the minimum and maximum values noted above. The forming temperature can at or above the melting temperature of the bond precursor material.

The bond precursor material may have a viscosity and certain flowability when heated at the forming temperatures. It is noted ceramic particles can affect viscosity and/or bond flow to facilitate improved formation of the bonded abrasive body. For instance, ceramic particles may help to reduce bond flow. In a further instance, comparing to a similar mixture without ceramic particles, the mixture including the ceramic particles may have a bond flow that can facilitate formation of improved number and/or size of bond bridges between abrasive particles.

Heat treating may further include heating the mixture in a non-oxidizing atmosphere. In at least another embodiment, the process of heat treating can include heating the mixture in a nitrogen-rich atmosphere, and more particularly an atmosphere that consists essentially of nitrogen. Furthermore, it will be appreciated that a non-oxidizing atmosphere can include one or more noble gases. Still, in another embodiment, the process of heat treating can be conducted in an ambient atmosphere (i.e., air).

After heat treating to form the bonded abrasive body, the bonded abrasive body may be incorporated into an abrasive article. It will be appreciated that the bonded abrasive body may have any suitable size and shape as known in the art and can be incorporated into various types of abrasive articles to form a bonded abrasive article suitable for conducting material removal operations including but not limited to, abrasive wheels, cones, hones, cups, flanged-wheels, tapered cups, segments, mounted-point tools, discs, thin wheels, large diameter cut-off wheels, and the like.

As noted, the abrasive article can have a body in the form of a bonded abrasive including bond material 201 in the form of bond bridge (also referred to as "bond post" in this disclosure) joining the abrasive particles 205, ceramic particles 202 contained the bond material 201, and pores 203 extending between the bond material 202 and abrasive particles 205. In a particular embodiment, the bond material 201 may form a bond matrix extending continuously through the volume of the body.

In an embodiment, the body can include bond posts having a particular average size that can facilitate improved formation and properties and performance of the abrasive article. In an aspect, the bond posts can have an average size Sbp greater than the average ceramic particle size D50c. In another aspect, the average bond post size (Sbp) can be greater than 12 microns, such as at least 13 microns, at least 15 microns, at least 17 microns, at least 19 microns, at least 20 microns, at least 22 microns, at least 24 microns, at least 25 microns, at least 26 microns, at least 37 microns, at least 38 microns, at least 39 microns, at least 40 microns, at least 42 microns, at least 45 microns, at least 47 microns, at least 49 microns, at least 51 microns, at least 53 microns, at least 55 microns, at least 57 microns, at least 59 microns, at least 62 microns, at least 65 microns, at least 67 microns, at least 70 microns, at least 74 microns, at least 76 microns, at least 78 microns, at least 80 microns, at least 82 microns, at least 84 microns, at least 87 microns, at least 90 microns, at least 93 microns, at least 95 microns, at least 98 microns, at least 100 microns, at least 110 microns, at least 120 microns, at least 140 microns, at least 160 microns, at least 180 microns, or at least 200 microns. In a further aspect, the body can include an average bond post size (Sbp) less than the average particle size (D50a) of the abrasive particles. In a further aspect, the average bond post size (Sbp) can be at most 1.8 mm, at most 1.5 mm, at most 1.2 mm, at most 900 microns, at most 850 microns, at most 830 microns, at most 800 microns, at most 750 microns, at most 700 microns, at most 650 microns, at most 600 microns, at most 550 microns, at most 500 microns, at most 450 microns, at most 400 microns, at most 380 microns, at most 350 microns, at most 320 microns, at most 300 microns, at most 280 microns, at most 260 microns, at most 255 microns, at most 220 microns, or at most 200 microns. It is to be appreciated the average bond post size can be in a range including any of the minimum and maximum values noted herein.

The average size of bond posts can be determined as follows. A cross section of a bonded abrasive body can be polished and high-contrasting scanning electron microscope images of the entire cross section can be taken. Usually at least 6 images are needed for the entire cross section. Image J is used to analyze the sizes of all the bond posts of the cross section, and the average of all the bond post sizes is used as the average bond post size in the body.

In a further embodiment, the bond material can have a particular Vickers hardness that can facilitate improved properties and performance of the abrasive article. In an aspect, the bond material can include an average Vickers hardness of at least 5.70 GPa, at least 5.75 GPa, or at least 5.80 GPa. In another aspect, the bond material can include an average Vickers hardness of at most 6.50 GPa, at most 6.45 GPa, or at most 6.40 GPa. It is to be appreciated that the bond material can include a Vickers hardness in a range including any of the minimum and maximum values noted herein. Vickers hardness is determined according to a standard test method for Vickers Indentation Hardness, ASTM C1327-2015.

In an embodiment, the ceramic particles can be substantially uniformly dispersed in the bond material. For instance, majority of the bond bridges can contain dispersed ceramic particles. In another instance, at least 51% of the bond bridges can contain dispersed ceramic particles, such as at least 60%, at least 65%, at least 70%, at least 75%, at least 80%, at least 85%, at least 90%, or at least 95% of bond bridges can contain dispersed ceramic particles. In one embodiment, all the bond bridges can contain dispersed ceramic particles.

In an embodiment, the body can include a particular content of bond material that can facilitate improved performance of the abrasive article. In an aspect, the body can include at least 2 vol % of the bond material for a total volume of the body, such as at least 4 vol %, at least 5 vol % or at least 6 vol % or at least 7 vol % or at least 8 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % or at least 20 vol % of the bond material for a total volume of the body. In another aspect, the body can include at most 35 vol % of the bond material for the total volume of the body, such as at most 30 vol % or at most 25 vol % or at most 20 vol %. Moreover, the body can include a content of the bond material in a range including any of the minimum and maximum percentages noted herein.

In an embodiment, the bond material can include a ceramic material, an amorphous material, or a combination thereof. A ceramic material is a composition that includes at least one metal or metalloid element, including but not limited to alkali metal element, alkaline earth metal elements, lanthanoids, transition metal elements, and a combination thereof. A ceramic material may include oxides, carbides, nitrides, borides, and a combination thereof. Moreover, a ceramic material can include a single crystalline phase, a polycrystalline phase, an amorphous phase, or a combination thereof. It will be appreciated that a ceramic material can consist essentially of a single crystalline phase, a polycrystalline phase, amorphous phase, or a combination thereof.

In an embodiment, the bond material can include a vitreous material. The vitreous material can have an amorphous phase. For instance, the bond material can consist essentially of a vitreous material having an amorphous phase. In another embodiment, the bond material can include a non-vitreous material. The non-vitreous material can include a polycrystalline phase. In still another embodiment, the bond material can include a mixture of polycrystalline and vitreous material.

In an embodiment, the bond material can include boron oxide ($B_2O_3$) in a particular content that may facilitate improved forming and/or performance of the abrasive article. Boron oxide can be present in a certain weight percentage compared to the total weight of the bond material. For example, boron oxide may be at most 30 wt % boron oxide ($B_2O_3$) for a total weight of the bond material, at most 28 wt %, at most 26 wt %, at most 24 wt %, or at most 22 wt %. For another instance, the bond material can include at least 2 wt % of boron oxide for a total weight of the bond material, such as at least 3 wt %, at least 4 wt %, or at least 5 wt %. In a particular instance, the content of boron oxide can be greater than 5 wt %, such as at least 6 wt %, at least 7 wt %, at least 8 wt %, at least 10 wt %, at least 12 wt %, or even at least 15 wt %. It will be understood that the content of boron oxide in the bond material can be in a range including any minimum to maximum percentages noted herein. For example, the bond material can include boron oxide in a range of 2 wt % to 30 wt %, in a range of 5 wt % to 30 wt %, or in a range of 8 wt % to 22 wt %.

In an embodiment, the bond material can include silicon oxide ($SiO_2$) in a certain content that may facilitate improved forming and/or performance of the abrasive article. The content of silicon oxide relative to the total weight of the bond material can be, for example, at most 80 wt %, at most 75 wt %, at most 70 wt %, at most 66 wt %, at most 65 wt %, at most 63 wt %, at most 60 wt %, at most 55 wt %, at most 52 wt %, or at most 50 wt %. In a particular instance, the bond material can include silicon oxide of less than 66 wt %. In another instance, the bond material can include at least 25 wt % silicon oxide, such as at least 30 wt %, at least 35 wt %, at least 38 wt %, at least 40 wt %, at least 42 wt %, at least 45 wt %, at least 47 wt %, at least 48 wt %, or even at least 49 wt %. It will be appreciated that the content of silicon oxide can be within a range including any minimum to maximum percentages noted above. For example, the silicon oxide content can be within a range of 35 wt % to 80 wt %, or within a range of 40 wt % to 65 wt %.

In a further embodiment, the bond material can include boron oxide and silicon oxide in a certain content that may facilitate improved forming and/or performance of the abrasive article. For instance, the total content of boron oxide and silicon oxide can be at most 80 wt %, such as at most 77 wt %, at most 75 wt %, at most 73 wt %, at most 70 wt %, at most 70 wt %, or at most 65 wt %. In another example, the total content of boron oxide and silicon oxide can be at least 40 wt %, at least 42 wt %, at least 46 wt %, at least 48 wt %, or even at least 50 wt % for at total weight of the bond material. It will be appreciated that the total content of boron oxide and silicon oxide can be within a range including any of the minimum and maximum percentages disclosed herein. For example, the total content of boron oxide and silicon oxide can be within a range from 40 wt % to 80 wt % or within a range from 42 wt % to 77 wt % or within a range from 46 wt % to 65 wt %.

In an embodiment, the bond material can include a particular ratio of weight percent silicon oxide ($SiO_2$): weight percent boron oxide ($B_2O_3$) that may facilitate improved forming and/or performance of the abrasive article. For example, the ratio can be at most 22:1, at most 21:1, at most 20:1, or at most 19:1. In a particular example, the ratio can be less than 19:1, such as at most 18:1, at most 16:1, at most 15:1, at most 12:1, at most 10:1, at most 9:1, at most 8:1, at most 7:1, at most 6.5:1, at most 6:1, at most 5.5:1, at most 5.2:1, at most 5:1, or at most 4.8:1. In another instance, the ratio of weight percent silicon oxide ($SiO_2$): weight percent boron oxide ($B_2O_3$) can be at least 1.3:1, at least 1.5:1, at least 1.7:1, at least 2:1, at least 2.2:1, at least 2.4:1, at least 2.6:1, at least 2.8:1, or at least 3:1. It will be appreciated that the ratio of weight percent silicon oxide ($SiO_2$):weight percent boron oxide ($B_2O_3$) can be within a range including any of the minimum and maximum values noted above, for example, the ratio can be within a range of 1:3 to 22:1 or within a range of 1:3 to 7:1.

In an embodiment, the bond material can include aluminum oxide ($Al_2O_3$) in a content that can facilitate improved forming and/or performance of the abrasive article. In an example, the bond material can include at least 5 wt % aluminum oxide ($Al_2O_3$) for a total weight of the bond material, at least 8 wt %, at least 9 wt %, at least 10 wt %, at least 12 wt %, or at least 14 wt %. In another example, the bond material can include at most 30 wt % aluminum oxide ($Al_2O_3$) for a total weight of the bond material, at most 28 wt %, at most 25 wt %, at most 23 wt %, or at most 20 wt %. In particular instance, the bond material can include at most or less than 20 wt % of aluminum oxide, such as at most 19 wt % or at most 18 wt % for the total weight of the bond material. It will be appreciated that the content of aluminum oxide can be within a range of any of the minimum and maximum percentages noted above, for instance, within a range of 5 wt % to 31 wt % or within a range of 10 wt % to 25 wt %.

In an embodiment, the bond material may include a content of aluminum and alumina that can facilitate improved forming and/or improved performance of the abrasive article. For example, the bond material can include at least 15 wt % of alumina and aluminum metal ($Al_2O_3$/Al) for a total weight of the bond material, such as at least 18 wt %, such as at least 20 wt %, at least 22 wt %, or even at least 24 wt % alumina and aluminum metal ($Al_2O_3$/Al) for a total weight of the bond material. In another example, the bond material can include at most 45 wt %, such as at most 42 wt %, at most 40 wt %, at most 38 wt %, at most 35 wt %, or even at most 32 wt % alumina and aluminum metal for a total weight of the bond material. It will be appreciated that the bond material can include a content of alumina and aluminum metal within a range including any of the minimum and maximum percentages noted herein. For instance, the content of alumina and aluminum metal can be within a range of 5 wt % to 45 wt % or within a range of 10 wt % to 40 wt % or within a range of 22 wt % to 35 wt % for the total weight of the bond material.

In an embodiment, the bond material can include aluminum oxide and silicon oxide. For instance, the total content of aluminum oxide and silicon oxide relative to the total weight of the bond material can be at least 50 wt %, such as at least 52 wt %, at least 56 wt %, at least 58 wt %, or even at least 60 wt %. In another example, the total content of aluminum oxide and silicon oxide can be at most 80 wt % for a total weight of the bond material, or at most 79 wt %. In a particular example, the total content of aluminum oxide and silicon oxide can be less than 79 wt %, such as at most 78 wt %, at most 77 wt %, at most 76 wt %, at most 75 wt %, at most 74 wt %, or at most 73 wt %. It will be appreciated that the total content of aluminum oxide and silicon oxide can be within a range of any of the minimum to maximum percentages noted herein, for instance, the total content can be within a range of 50 wt % to 79 wt %, within a range of 56 wt % to 75 wt %, or even within a range of 60 wt % to 73 wt %.

In an embodiment, the bond material can include a particular ratio of weight percent silicon oxide ($SiO_2$): weight percent aluminum oxide ($Al_2O_3$) that can facilitate improved forming and/or improved performance of the abrasive article. For instance, the ratio can be at most 5.5:1, at most 5:1, at most 4.5:1, at most 4:1, at most 3.5:1, at most 3:1, at most 2.5:1, at most 2.2:1, or at most 2:1. In another instance, the ratio of weight percent silicon oxide ($SiO_2$): weight percent aluminum oxide ($Al_2O_3$) can be at least 1.3:1, at least 1.5:1, at least 1.7:1, or at least 2:1. It will be appreciated that the ratio of weight percent silicon oxide to weight percent aluminum oxide can be within a range including any of the minimum and maximum ratios noted above, for example, the ratio can be within a range of 1:1 to 2.5:1 or within a range of 1.3:1 to 2.2:1.

In an embodiment, the bond material can include a particular content of zircon ($ZrSiO_4$) that may facilitate formation of the abrasive article and improve performance. For example, the bond material may include at least 1 wt % zircon for the total weight of the bond material, such as at least 2 wt % or at least 3 wt % or at least 4 wt % or at least 5 wt % or at least 6 wt % or at least 7 wt % or at least 8 wt % or at least 9 wt % or at least 10 wt % or at least 11 wt % or at least 12 wt % or at least 13 wt % or at least 14 wt % or at least 15 wt % or at least 16 wt % or at least 17 wt % or at least 18 wt % or at least 19 wt % or at least 20 wt % or at least 21 wt % or at least 22 wt % or at least 23 wt % or at least 24 wt % or at least 25 wt % or at least 26 wt % or at least 27 wt % or at least 28 wt % or at least 29 wt % for a total weight of the bond material. In another instance, the bond material may include at most 44 wt % zircon, at most 42 wt %, at most 40 wt %, at most 38 wt %, at most 36 wt %, at most 35 wt %, at most 34 wt %, at most 33 wt %, or at most 32 wt % for at total weight of the bond material. It will be appreciated that the bond material can include a content of zircon within a range including any of the minimum and maximum percentages noted above. In at least one embodiment, the bond material can be essentially free of zircon ($ZrSiO_4$).

In an embodiment, the bond material can include at least one alkaline earth oxide compound (RO) in a content that may facilitate improved forming and/or performance of the abrasive article. The total content of alkaline earth oxide compounds relative to the total weight of the bond material may be at most 6 wt %, at most 5 wt %, at most 4 wt %, at most 3.0 wt %, at most 2.5 wt %, or at most 2 wt %. In another embodiment, the total content of alkaline earth oxide compounds (RO) can be at least 0.5 wt % or at least 0.8 wt %. It will be appreciated that the total content of alkaline earth oxide compounds can be within a range including any of the minimum and maximum percentages noted herein, for instance, the total content can be within a range of 0.5 wt % to 5.0 wt %.

In an embodiment, the bond material can include at most 3 different alkaline earth oxide compounds (RO) selected from the group of calcium oxide (CaO), magnesium oxide (MgO), barium oxide (BaO), strontium oxide (SrO).

For instance, the bond material can include at least 0.5 wt % calcium oxide (CaO) for a total weight of the bond material, at least 0.8 wt %, or at least 1 wt %. Alternatively, or additionally, the bond material can include at most 3 wt % calcium oxide (CaO) for a total weight of the bond material, at most 2.8 wt %, or at most 2.5 wt %, at most 2 wt %, or at most 1.7 wt %. Moreover, the content of calcium oxide can be in a range including any of the minimum and maximum percentages noted herein. In at least one embodiment, the bond material can be essentially free of calcium oxide (CaO).

In an embodiment, the bond material can include an alkali oxide compound ($R_2O$). Exemplary alkali oxide compounds can include lithium oxide ($Li_2O$), sodium oxide ($Na_2O$), potassium oxide ($K_2O$), cesium oxide ($Cs_2O$), or the like. In a further embodiment, the bond material can include at least one alkali oxide compound. Particularly, the bond material comprises an alkali oxide compound ($R_2O$) selected from the group of compounds consisting of lithium oxide ($Li_2O$), sodium oxide ($Na_2O$), potassium oxide ($K_2O$), and cesium oxide ($Cs_2O$) and a combination thereof.

In an embodiment, the total content of the alkali oxide compounds relative to the total weight of the bond material can be at most 25 wt %, or at most 22 wt % or at most 20 wt %. Alternatively, or additionally, the total content of the alkali oxide compounds can be at least 3 wt %, at least 5 wt %, at least 7 wt %, or at least 9 wt %. It will be appreciated that the total content of alkali oxide compounds can be within a range of any of the minimum to maximum percentages noted herein. For example, the total content of alkali oxide compounds can be within a range of 3 wt % to 25 wt % or within a range of 7 wt % to 22 wt %.

In an embodiment, the bond material can include lithium oxide ($Li_2O$) in a content that can facilitate improved forming and/or performance of the abrasive article. For example, the bond material comprises at least 1 wt % lithium oxide ($Li_2O$) for a total weight of the bond material, at least 1.5 wt %, or at least 2 wt %. In another instance, the bond material can include at most 7 wt % lithium oxide ($Li_2O$) for a total weight of the bond material, at most 6.5 wt %, at most 6 wt %, at most 5.5 wt %, or at most 5 wt %. It will be appreciated that the content of lithium oxide can be within a range of any of the minimum to maximum percentages noted above, including for example, within a range of 1 wt % to 7 wt % or 1.5 wt % to 6 wt %. In at least one embodiment, the bond material is essentially free of lithium oxide ($Li_2O$).

In an embodiment, the bond material can include sodium oxide ($Na_2O$) in a content that can facilitate improved forming and/or performance of the abrasive article. The content of sodium oxide relative to the total weight of the bond material can be, for example, at least 3 wt %, at least 4 wt %, or at least 5 wt %. In another example, the content of sodium oxide can be at most 15 wt % sodium oxide ($Na_2O$) for a total weight of the bond material, at most 14 wt %, at most 13 wt %, at most 12 wt %, at most 11 wt %, or at most 10 wt %. It will be appreciated that the content of sodium oxide can be within a range of any of the minimum to maximum percentages noted above, including for example, within a range of 3 wt % to 14 wt % or within a range of 4 wt % to 11 wt %.

In an embodiment, the bond material can include potassium oxide ($K_2O$) in a content that can facilitate improved forming and or performance of the abrasive article. For instance, the content of potassium oxide for the total weight of the bond material can be at least 1 wt %, at least 1.5 wt %, or at least 2 wt %. In another instance, the content of potassium oxide ($K_2O$) can be at most 15 wt % for a total weight of the bond material, such as at most 13 wt %, at most 11 wt %, at most 10 wt %, at most 8 wt %, at most 7 wt %, at most 6.5 wt %, at most 6 wt %, or at most 5.5 wt %, or at most 5 wt %. It will be appreciated that the content of potassium oxide can be within a range of any of the minimum to maximum percentages noted herein, including for example, within a range of 1 wt % to 15 wt %.

In an embodiment, the bond material can include phosphorous oxide ($P_2O_5$) in a content that can facilitate improved forming and/or performance of the abrasive article. For example, the bond material can include at most 3.0 wt % phosphorous oxide ($P_2O_5$), such as at most 2 wt % or at most 1 wt %. In at least one embodiment, the bond material can be essentially free of phosphorus oxide ($P_2O_5$).

In an embodiment, the bond material can include a particular content of certain components that facilitates suitable formation and/or performance of the abrasive article. Such components can include manganese dioxide ($MnO_2$), iron oxide ($Fe_2O_3$), $ZrSiO_2$, $CoAl_2O_4$, titanium dioxide ($TiO_2$), or any combination thereof. For example, in one instance, the bond material can include at most 2 wt % of any one of manganese dioxide ($MnO_2$), iron oxide ($Fe_2O_3$), $ZrSiO_2$, $CoAl_2O_4$, or titanium dioxide ($TiO_2$) for the total weight of the bond material, such as at most 1 wt % or even at most 0.5 wt %. In at least one embodiment, the bond material can be essentially free of any one of or combination of manganese dioxide ($MnO_2$), iron oxide ($Fe_2O_3$), $ZrSiO_2$, $CoAl_2O_4$, or titanium dioxide ($TiO_2$).

In an embodiment, the body can include a particular content of abrasive particles that can facilitate improved performance of the abrasive article. In an aspect, the body can include at least 20 vol % of abrasive particles for a total volume of the body, at least 25 vol %, at least 30 vol %, at least 33 vol %, or at least 35 vol %. In another aspect, the body can include at most 65 vol % abrasive particles for a total volume of the body, at most 64 vol %, or at most 62 vol % or at most 60 vol % or at most 58 vol % or at most 56 vol % or at most 55 vol % or at most 54 vol % or at most 52 vol % or at most 50 vol %. Moreover, the body can include a content of the abrasive particles in a range including any of the minimum and maximum percentages noted herein.

In another embodiment, the body can include a particular ratio of the average particle size of abrasive particles D50a to the average particle size of ceramic particles, D50a/D50c, that can facilitate improved properties and performance of the abrasive article. In an aspect, the ratio D50a/D50c can be at most 35, at most 34.8, at most 34.5, at most 34.2, at most 34, at most 33.8, at most 33.5, at most 33.2, at most 33, at most 32.7, at most 32.5, at most 32.1, at most 31.8, at most 31.5, at most 31, at most 30.5, at most 30, at most 29.6, at most 29.3, at most 29, at most 28.6, at most 28.3, at most 28, at most 27.6, at most 27.3, at most 27, at most 26.6, at most 26.3, at most 26, at most 25.7, at most 25.3, at most 25, at most 24.8, at most 24.5, at most 24.2, at most 24, at most 23.7, at most 23.4 at most 23, at most 22.8, at most 22.5, at most 22.1, at most 21.8, at most 21.5, at most 21, at most 20.5, at most 20, at most 19.6, at most 19.3, at most 19, at most 18.8, at most 18.6, at most 18.3, at most 18, at most 17.6, at most 17.2, at most 17, at most 16.6, at most 16.3, at most 16, at most 15.7, at most 15.3, at most 15, at most 14.8, at most 14.5, at most 14.2, at most 14, at most 13.7, at most 13.5, at most 13.3, at most 13, at most 12.5, at most 12.3, at most 12, at most 11.8, at most 11.5, at most 11.3, at most 11, at most 10.9, at most 10.7, at most 10.6, at most 10.3, at most 10, at most 9.8, at most 9.6, at most 9.5, at most 9.2, or at most 9. In another instance, the ratio D50a/D50c can be at least 4, at least 4.2, at least at least 4.5, at least 4.8, at least 5, at least 5.2, at least 5.4, at least 5.6, at least 5.9, at least 6.2, at least 6.5, at least 6.8, at least 7, at least 7.2, at least 7.6, at least 8, at least 8.2, at least 8.5, at least 8.8, at least 9, at least 9.2, at least 9.5, at least 9.7, at least 9.9, at least 10.1, at least 10.5, at least 10.8, at least 10.9, at least 11, at least 11.1, at least 11.2, at least 11.5, at least 11.7, at least 11.9, at least 12.1, at least 12.3, at least 12.7, at least 13, at least 13.2, at least 13.4, at least 13.6, at least 13.9, at least 14, at least 14.2, at least 14.3, at least 14.5, at least 14.7, at last 14.9, at least 15, at least 15.2, at least 15.3, at least 15.5, at least 15.7, at least 16, at least 16.2, at least 16.4, at least 16.6, at least 16.9, at least 17, at least 17.2, at least 17.3, at least 17.5, at least 17.7, at last 17.9, at least 18, at least 18.2, at least 18.3, at least 18.5, at least 18.7, at least 19, at least 19.2, at least 19.4, at least 19.6, at least 19.9, at least 20, at least 20.2, at least 20.4, at least 20.5, at least 20.7, at last 21, at least 21.5, at least 21.7, at least 21.9, at least 22, at least 22.3, at least 22.5, at least 22.8, at least 23, at least 23.2, at least 23.6, at least 24, at least 24.2, at least 24.5, at least 24.7, at least 25, at least 25.3, at least 25.5, at least 25.7, at least 26, at least 26.2, at least 26.4, at least 26.6, at least 26.9, at least 27, at least 27.2, at least 27.3, at least 27.5, at least 27.7, at last 27.9, at least 28.1, at least 28.2, at least 28.5, at least 28.7, at least 29, at least 29.1, at least 29.4, at least 29.6, at least 29.8, at least 30, at least 30.2, at least 30.4, at least 30.5, at least 30.7, at last 30.9, at least 31, at least 31.2, at least 31.3, at least 31.5, at least 31.7, at least 31.9, at least 32, at least 32.2, at least 32.4, at least 32.7, at least 33, at least 33.4, at least 33.6, at least 33.9, at least 34, at least 34.2, at least 34.5, at least 34.7, at last 34.9, at least 35, at least 35.2, at least 35.5, at least 35.8, at least 36, at least 36.2, at least 36.5, at least 36.7, at least 37, at least 37.2, at least 37.4, at least 37.6, at least 37.9, at least 38, at least 38.3, at least 38.5, at least 38.7, at last 39, at least 39.3, at least 39.5, at least 39.7, at least 40, at least 40.2, at least 40.5, at least 40.7, at least 41, at least 41.2, at least 41.4, at least 41.6, at least 41.9, at least 42, at least 42.3, at least 42.5, at least 42.7, at last 42.9, at least 43, at least 43.2, at least 42.3, at least 42.5, at least 42.7, at least 43, at least 43.2, at least 43.4, at least 43.6, at least 43.9, at least 44, at least 44.2, at least 44.3, at least 44.5, at least 44.7, at last 44.9, or at least 45. Moreover, the ratio D50a/D50c can be in a range including any of the maximum and minimum values noted herein.

In an embodiment, the body can include a particular porosity that can facilitate improved performance of the abrasive article. In an aspect, the body can include a porosity of at least 20 vol % for a total volume of the body, such as at least 22 vol %, at least 24 vol %, at least 26 vol %, at least 28 vol %, at least 30 vol %, at least 32 vol %, or at least 35 vol %. In another aspect, the body can include at most 75 vol % porosity for a total volume of the body, at most 70 vol %, at most 65 vol %, at most 62 vol %, at most 60 vol %, at most 55 vol %, at most 50 vol %, at most 45 vol %, or at most 40 vol %. It will be appreciated that the porosity of the body can be within a range including any of the minimum to maximum percentages noted above.

The porosity of the body can be in various forms. For instance, the porosity can be closed, open, or include closed porosity and open porosity. In an embodiment, the porosity can include a type of porosity selected from the group consisting of closed porosity, open porosity, and a combination thereof. In another embodiment, the majority of the porosity can include open porosity. In a particular embodiment, all of the porosity can essentially be open porosity. Still, in another embodiment, the majority of the porosity can include closed porosity. For example, all of the porosity can be essentially closed porosity.

The body can include pores having certain average pore sizes. In an embodiment, the average pore size may be at most 3 mm, at most 2.5 mm, at most 2 mm, at most 1.9 mm, at most 1.5 mm, at most 1 mm, at most 900 microns, at most 800 microns, at most 700 microns, at most 600 microns, at most 500 microns, at most 450 microns, at most 400 microns, at most 350 microns, at most 300 microns, at most 250 microns, at most 200 microns, at most 150 microns, or at most 100 microns. In another embodiment, the average pore size can be at least 0.01 microns, at least 0.1 microns, at least 1 micron, at least 5 microns, at least 8 microns, at least 10 microns, at least 14 microns, at least 16 microns, at least 25 microns, at least 50 microns, at least 100 microns, at least 150 microns, or at least 200 microns. It will be appreciated that the body can have an average pore size in a range including any of the minimum to maximum values noted above. In this disclosure, the average pore size can be measured using ASTM standard E112 Standard Test Methods for Determining Average Grain Size. Cross-sectional images of the body were viewed at 60× magnification on a Hitachi Microscope. The macro to determine pore length follows a technique to measure crystal size based on including drawing 6 equally spaced lines on the image and determining the regions of the line that intersect with a pore. The regions of the lines that intersect the pore are measured. This process was repeated for seven different images of portions of the bonded abrasive body. After all images were analyzed the values were averaged to calculate the average pore size. Moreover, it will be appreciated that reference to the average pore size can also be reference to a mean pore size.

The abrasive articles can have notably improved performance compared to a corresponding conventional abrasive article. A corresponding conventional abrasive article is intended to refer to a similar abrasive article that does not include ceramic particles as described in embodiments herein. In at least one embodiment, the abrasive article representative of embodiments herein can have improved performance including power draw, G-Ratio, wear rate, and/or material removal rate compared to a corresponding conventional abrasive article, and at the same time can have a modulus of rupture (MOR) similar to the corresponding conventional abrasive article. In certain instances, the abrasive article representative of embodiments herein can have improved modulus of rupture (MOR) compared to the corresponding conventional abrasive article.

In certain applications, the abrasive article can have an MOR of at least 38 MPa, at least 39 MPa, at least 40 MPa, at least 41 MPa, at least 43 MPa, at least 45 MPa, at least 46 MPa, at least 47 MPa, or at least 48 MPa. In other applications, the abrasive article can include an average MOR of at most 60 MPa, at most 58 MPa, at most 56 MPa, at most 55 MPa, at most 53 MPa, at most 52 MPa, at most 50 MPa, or at most 49 MPa. Moreover, the abrasive article can include an MOR in a range including any of the minimum and maximum values noted herein.

Figure 3:
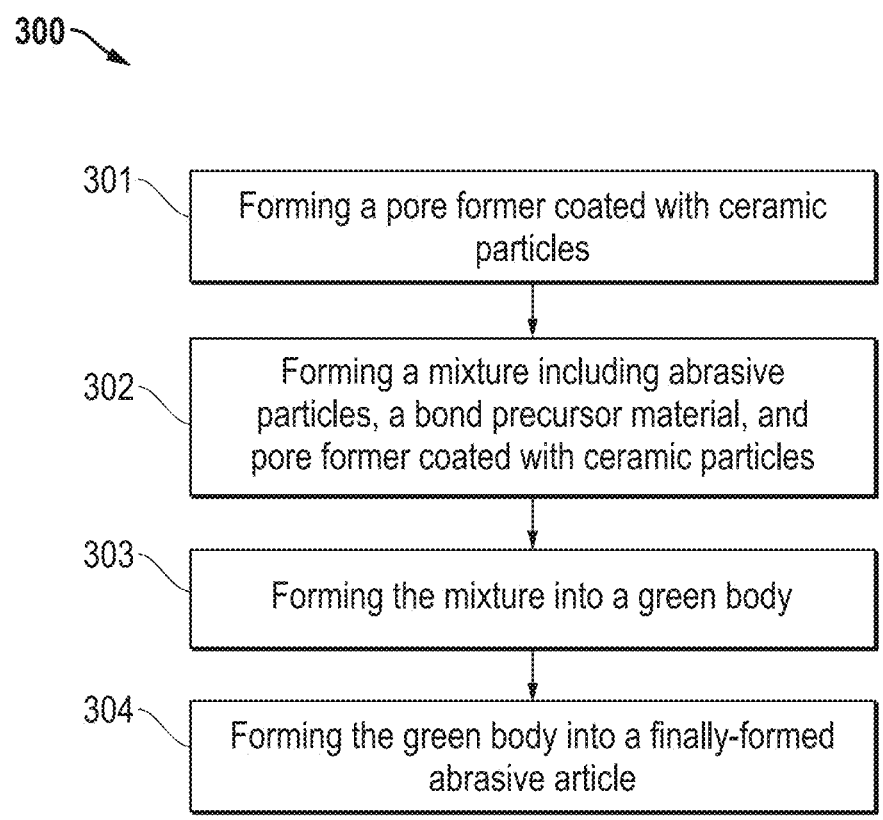
FIG. 3 includes a flowchart illustrating a forming process according to another embodiment.

FIG. 3 includes a flow chart illustrating a forming process 300 of an abrasive article. The process can start at block 301, forming a pore former coated with ceramic particles. In an embodiment, the pore former can include materials having low volatilization temperatures, such that upon high temperature processing needed to form the bonded abrasive body, such pore forming materials volatilize forming a gas thereby leaving pores behind in the final formed bonded abrasive body. Suitable pore formers can include inorganic or organic materials. Suitable inorganic materials can include oxides or carbon-containing materials, such as graphite. Suitable oxide-containing materials may include glasses, glass-ceramics, ceramics, or a combination thereof. Some suitable organic pore forming materials can include wax, seeds, and shells, sulfosuccinates, naphthalenes, polyvinyls, ketones, polystyrenes, polyethylenes, polypropylenes, acrylics, benzene-containing polymers, alkyds, polyalkydes, epoxies, phenolics, acetals, and a combination thereof. Suitable inorganic pore formers can include hollow particles, such as beads, spheres, or the like made of materials such as glass, ceramics, glass-ceramics, hollow glass beads, ground walnut shells, beads of plastic material or organic compounds, foamed glass particles and bubble alumina, elongated grains, fibers or a combination thereof. Other inorganic pore-forming materials can include salts such as such as sodium chloride, potassium chloride, magnesium chloride, calcium chloride, sodium silicate, sodium carbonate, sodium sulfate, potassium sulfate, magnesium sulfate, and the like, and a combination thereof.

The pore formers can have particle sizes suitable for forming a desired porosity within the bonded abrasive body. For instance, pore formers can include an average particle size similar to the pore sizes described in embodiments herein.

In an exemplary implementation, a binder material may be used to facilitating formation of pore formers coated with ceramic particles. An exemplary binder material can include a glycol, dextrin, resin, glue or alcohol, or combinations thereof.

Figure 4:
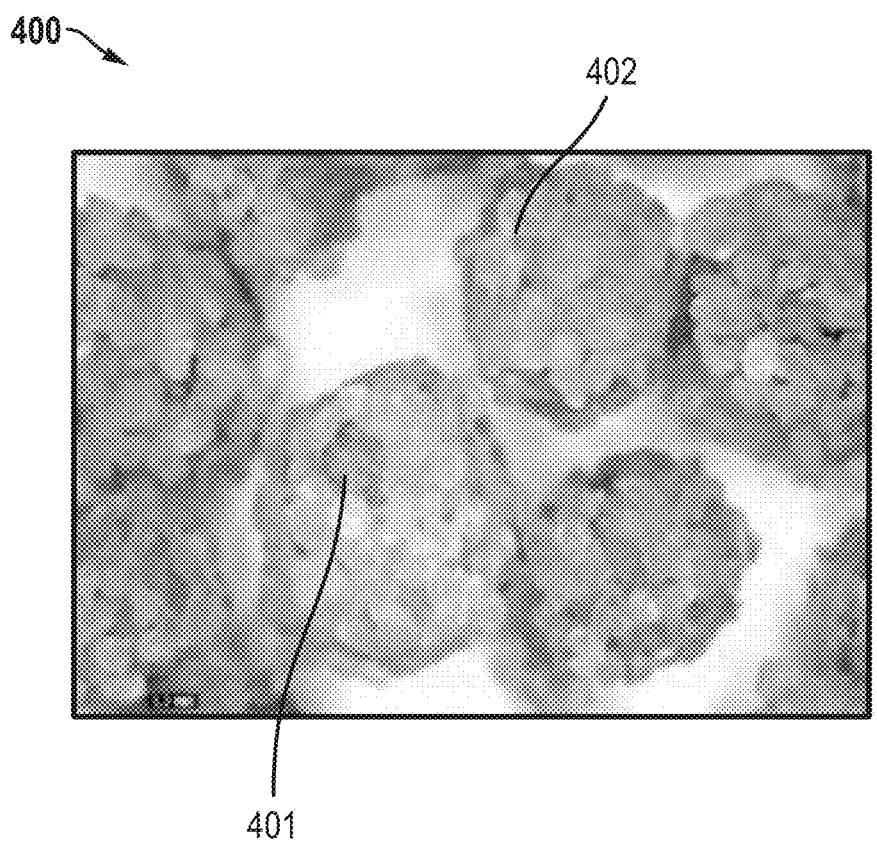
FIG. 4 includes an SEM image of pore former coated with ceramic particles according to an embodiment.

In another embodiment, ceramic particles may be mixed with pore former at a particular ratio that can facilitate improved formation of abrasive articles. For instance, a ratio (Vc:Vpf) of the volume of the ceramic particles Vc to the volume of pore former Vpf can be at least 0.01:1, at least 0.1:1, at least 0.2:1, at least 0.5:1, at least 1:1, at least 2:1, at least 3:1, at least 5:1, or at least 10:1. In another instance, the ratio (Vc:Vpf) of the volume of the ceramic particles Vc to the volume of pore former Vpf can be at most 100:1, at most 80:1, at most 50:1, at most 30:1, at most 20:1 or at most 10:1. It will be appreciated the ratio (Vc:Vpf) of the volume of the ceramic particles Vc to the volume of pore former Vpf can be in a range including any of the minimum and maximum values noted herein. FIG. 4 includes an image of coated pore formers 400 including a pore former 401 coated with ceramic particles 402.

The process can continue to block 302, forming a mixture including abrasive particles, bond precursor materials, and pore formers coated with ceramic particles. The mixture can include a particular content of the coated pore formers that can facilitate formation of improved property and performance of the abrasive article. For instance, the mixture can contain a minor amount of such pore formers, such as at most 40 vol % of the total volume of the mixture, at most 30 vol %, at most 25 vol %, at most 20 vol %, or at most 10 vol %. In another instance, the mixture can include at least 1 vol % of the coated pore formers, such as at least 2 vol % or at least 5 vol % of the total volume of the mixture. It will be appreciated the content of the coated pore former can be in a range including any of the minimum and maximum percentages noted herein.

The mixture can include bond precursor material, abrasive particles, and optionally, filler and/or additives as described in embodiments herein with respect to process 100.

Process 300 can continue to block 303 and 304 in a similar manner as described with respect to process 100 in this disclosure.

In an embodiment, the bonded abrasive body can include a particular distribution of the ceramic particles. For example, bonded abrasive bodies formed according to process 300 may have a distinct distribution of ceramic particles compared to bonded abrasive bodies formed according to process 100. In an aspect, the bonded abrasive body can include pores at least partially defined by ceramic particles. For instance, at least 50% of the pores can be at least partially defined by ceramic particles, such as at least 55%, at least 60%, at least 70%, at least 80%, at least 90%, or at least 95% of the pores in the body can be partially defined by ceramic particles.

In another aspect, ceramic particles can have a concentrated distribution adjacent pores. For instance, at least a majority of ceramic particles can be distributed around pores in the body. In another instance, at least 55% of the total volume of the ceramic particles can be distributed adjacent pores, such as at least 50%, at least 65%, at least 70%, at least 75%, at least 80%, at least 85%, at least 90, or at least 95%. In another instance, a minority of the ceramic particles may have a dispersed distribution in bond bridges, such as less than 50%, at most 40%, at most 30%, at most 20%, at most 10%, or at most 5% of the total volume of the ceramic particles can be dispersed in bond bridges.

In a further aspect, ceramic particles can form a continuous or a discontinuous layer adjacent or at the edge of pore. In a particular aspect, the abrasive body can include a particular average thickness of such layers of the ceramic particles that can help hold the pores in the abrasive body. For an example, the average thickness of layers of the ceramic particles can be at least 50 microns, at least 100 microns, at least 200 microns, at least 300 microns, at least 400 microns, or at least 500 microns. In another instance, the layers of the ceramic particles can have an average thickness of at most 500 microns, at most 400 microns, at most 300 microns, at most 200 microns, at most 100 microns, or at most 50 microns. In a particular instance, the average thickness can be in a range including any of the minimum and maximum values noted herein.

Figure 9:
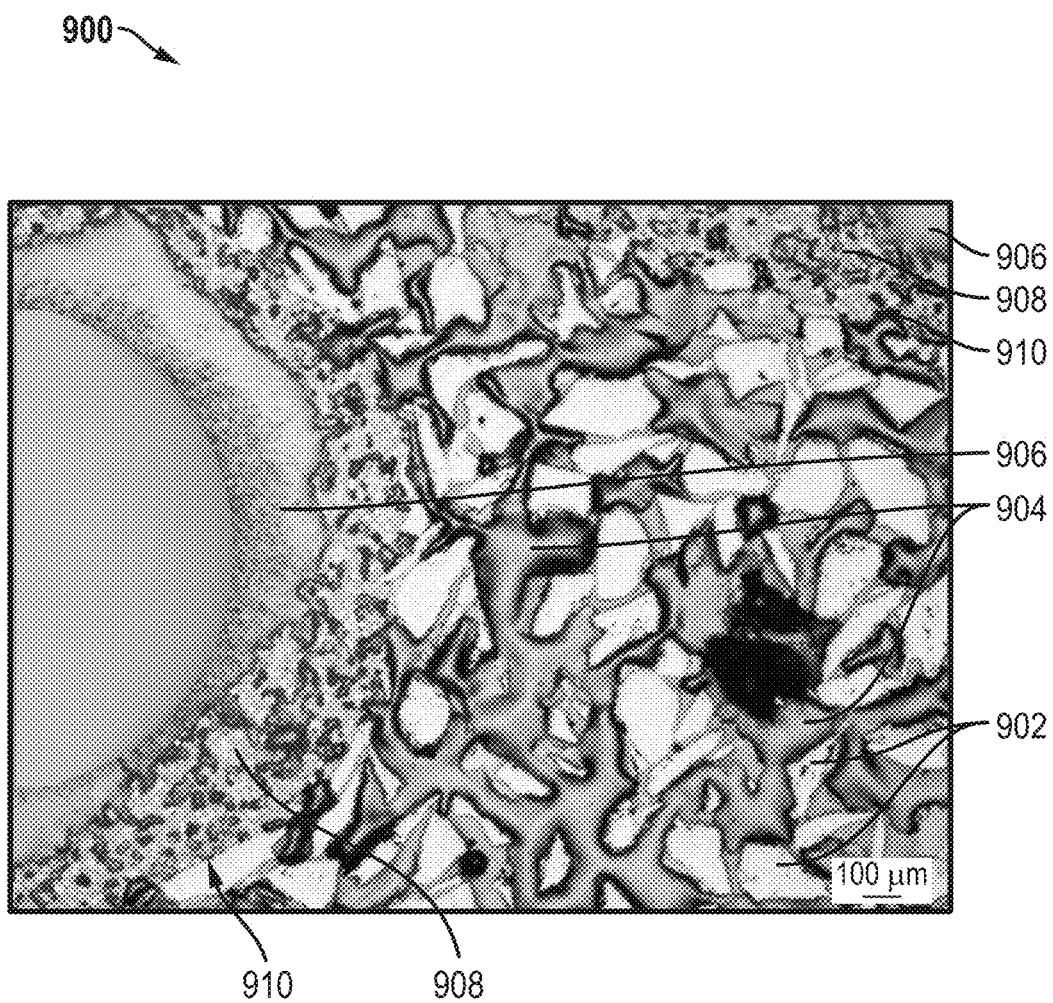
FIG. 9 includes an SEM image of a cross section of an exemplary abrasive article according to an embodiment.
Figure 10:
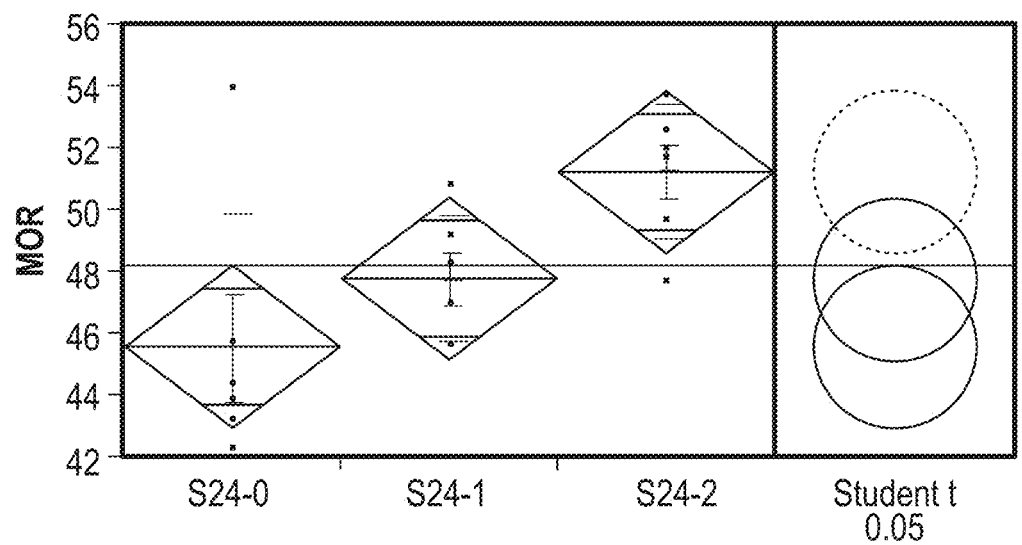
FIGS. 10 to 24 include illustrations of MOR of abrasive samples.
Figure 11:
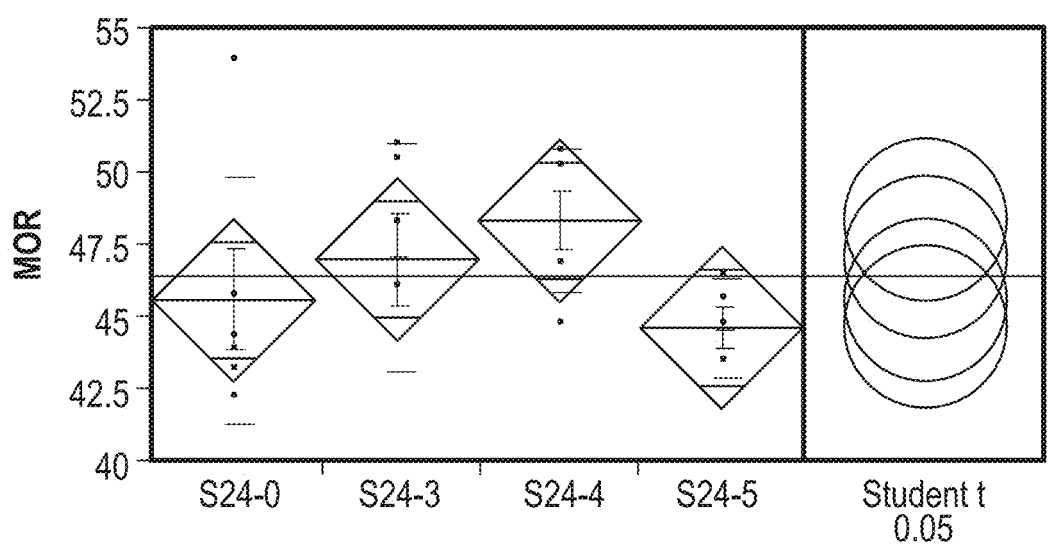
Figure 12:
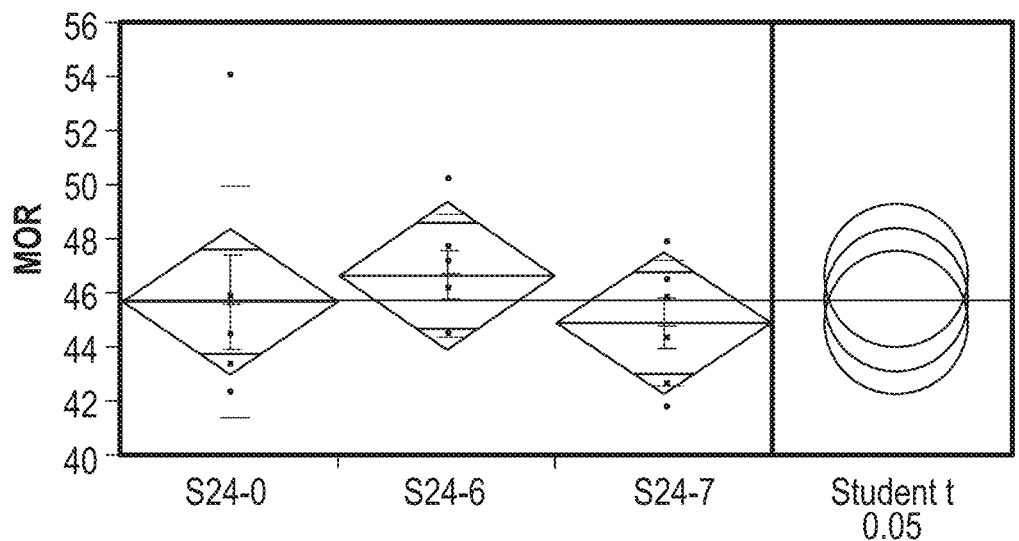
Figure 13:
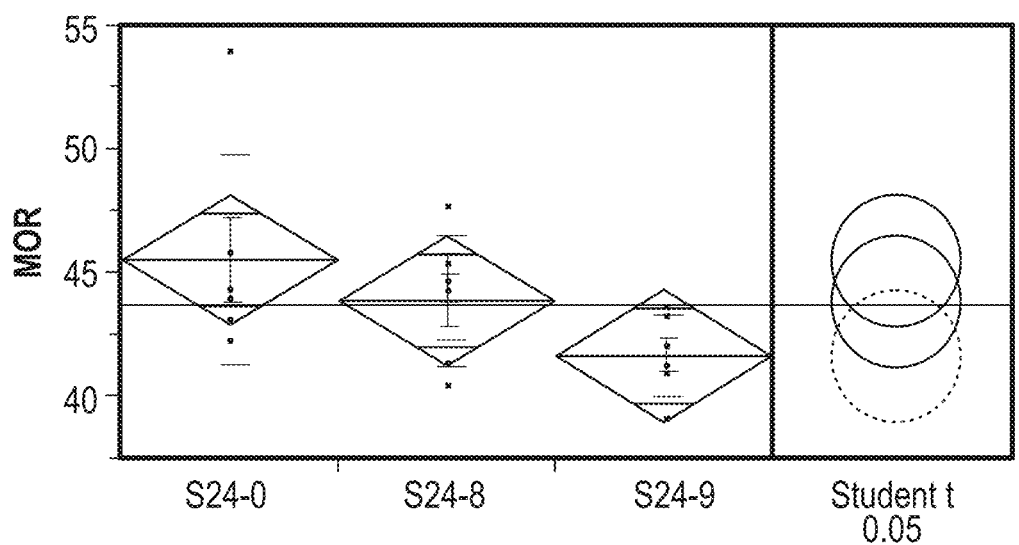
Figure 14:
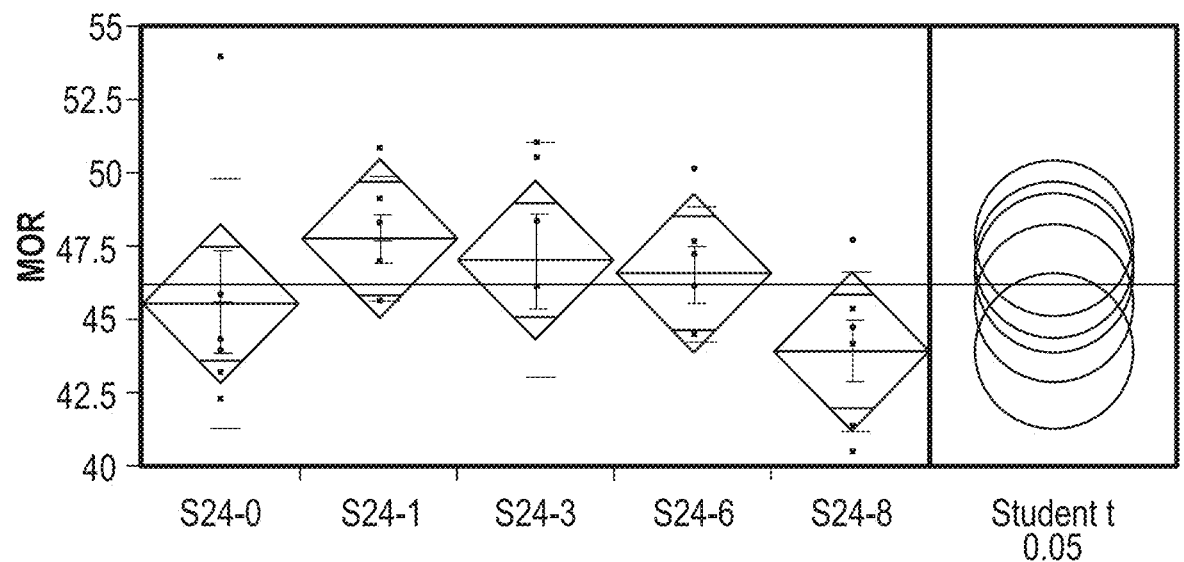
Figure 15:
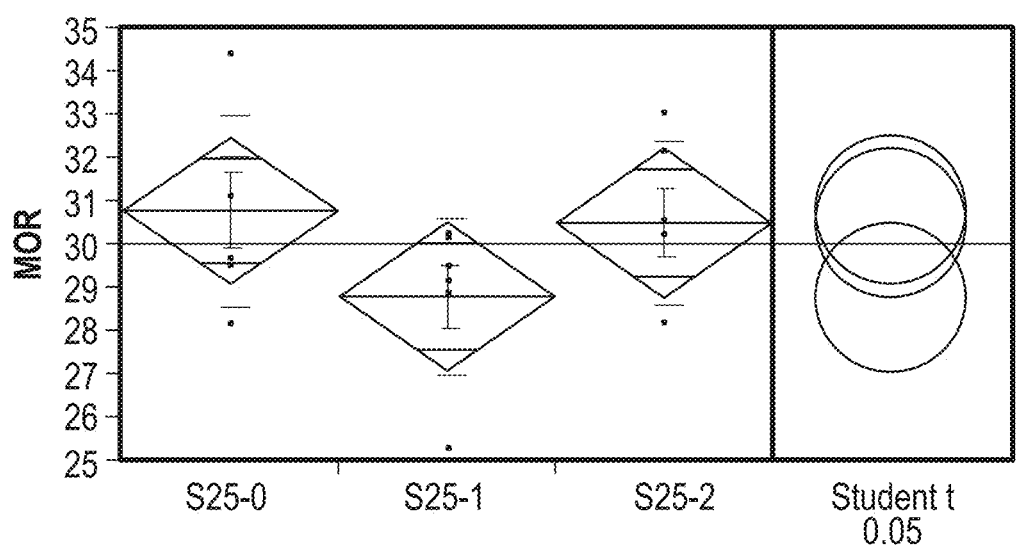
Figure 16:
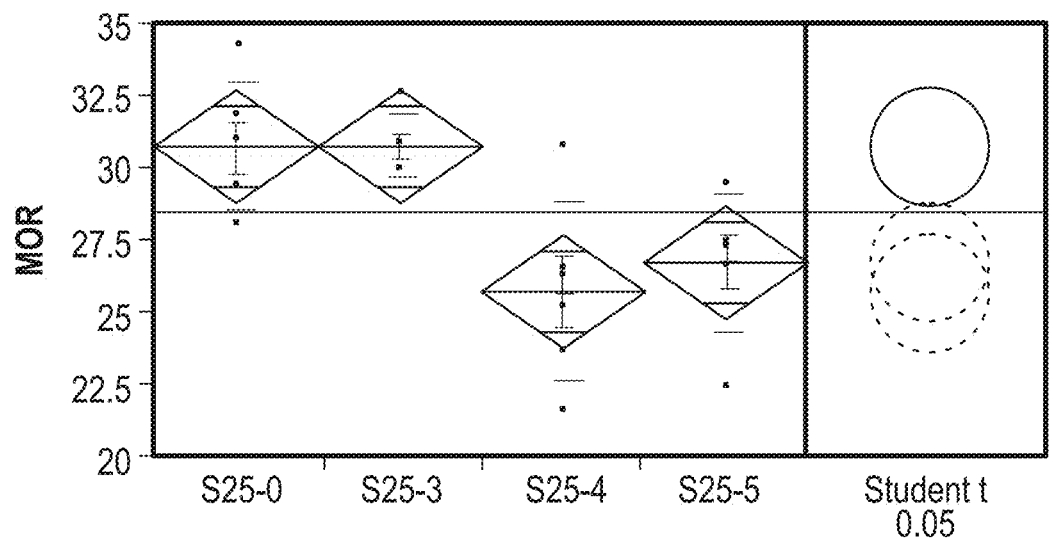
Figure 17:
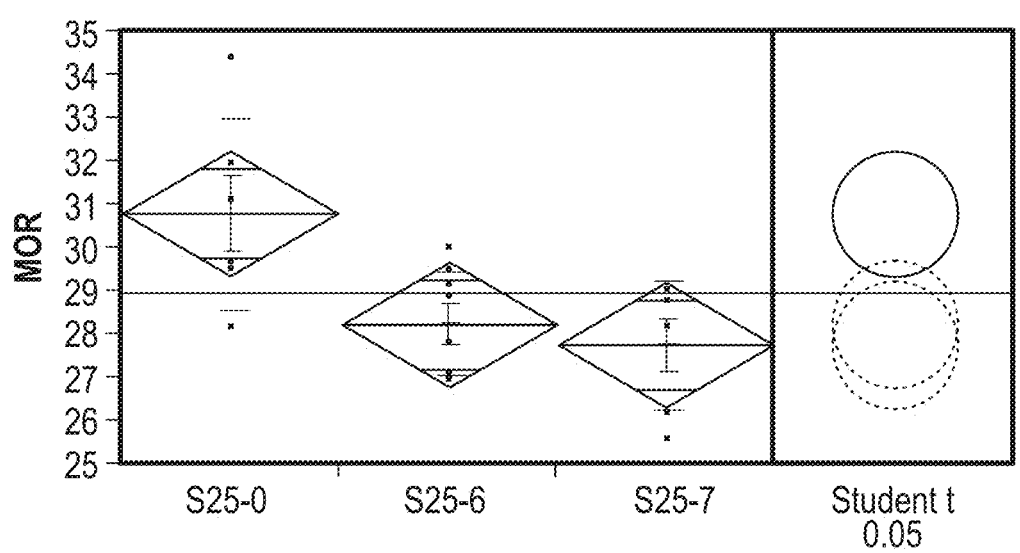
Figure 18:
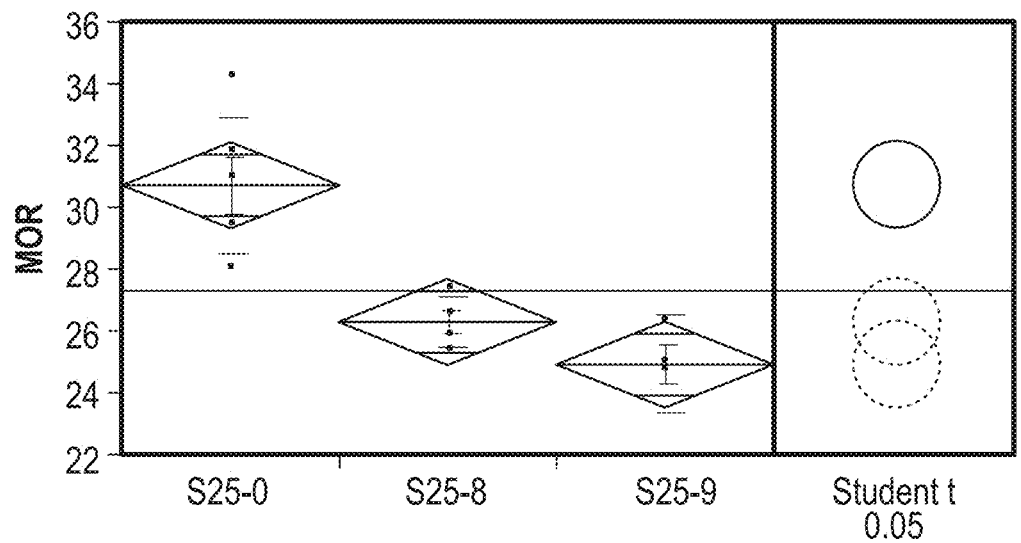
Figure 19:
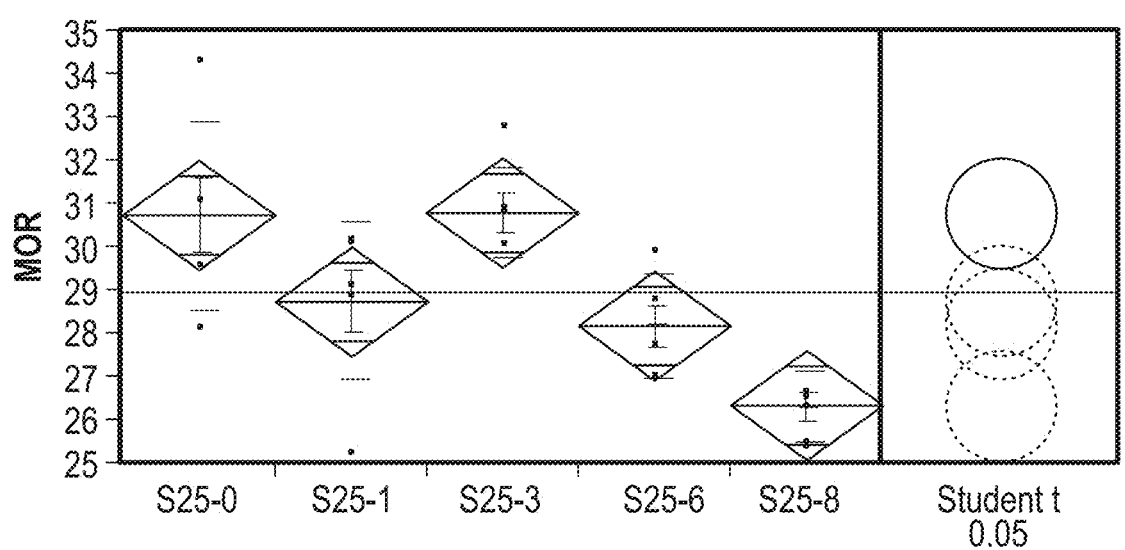
Figure 20:
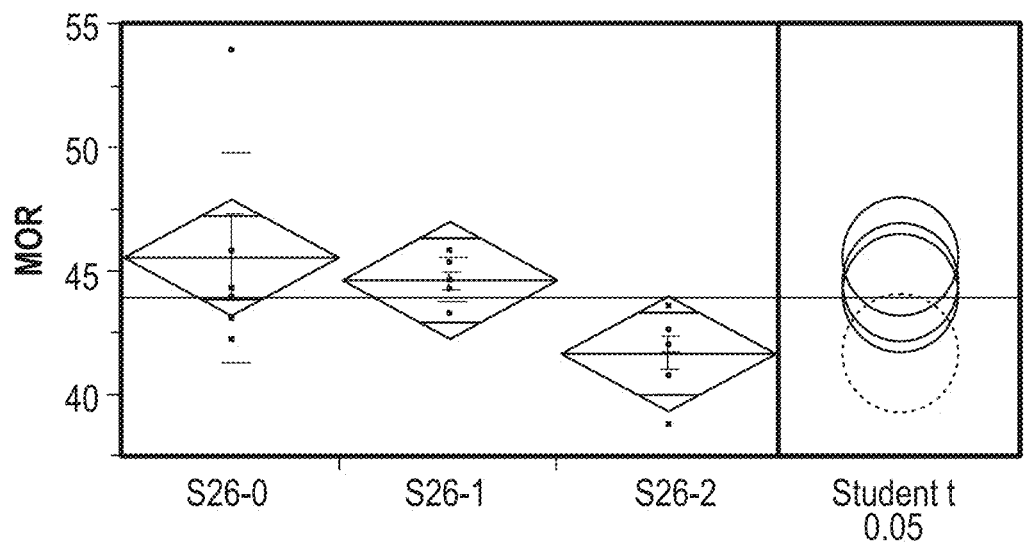
Figure 21:
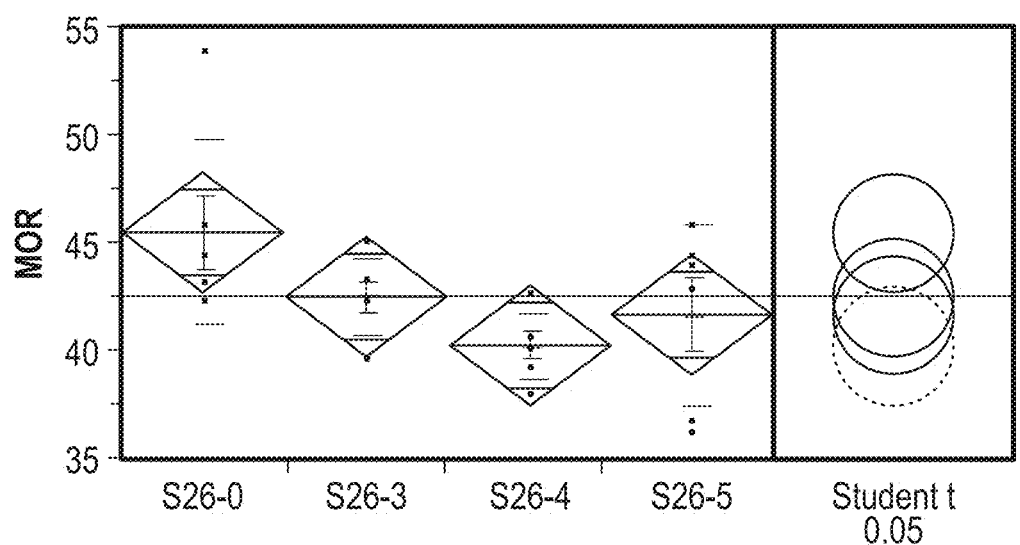
Figure 22:
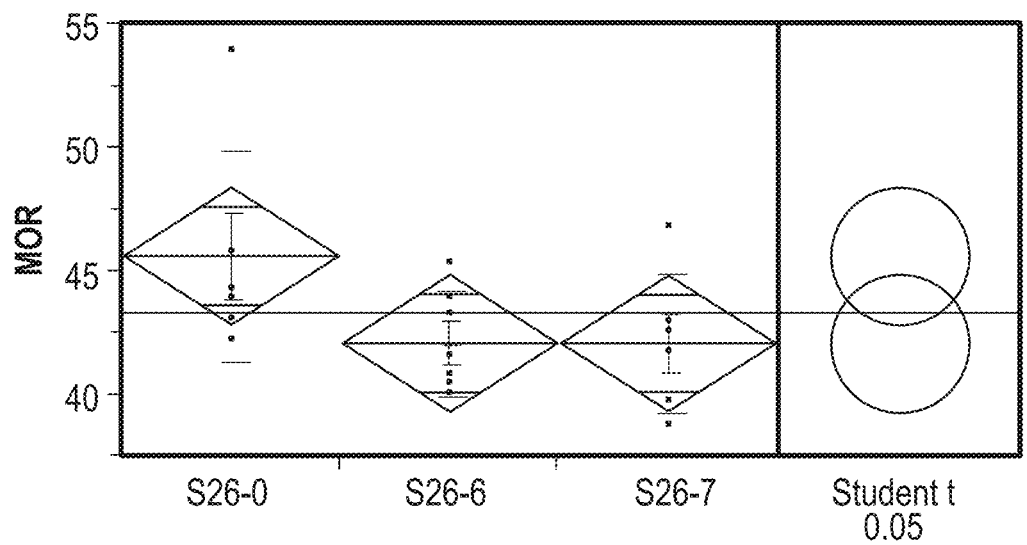
Figure 23:
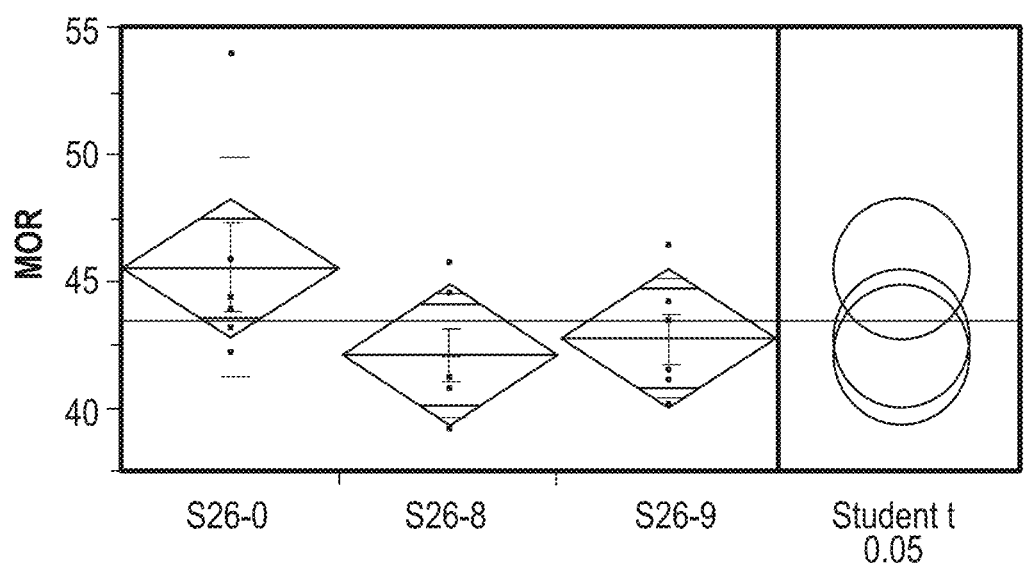
Figure 24:
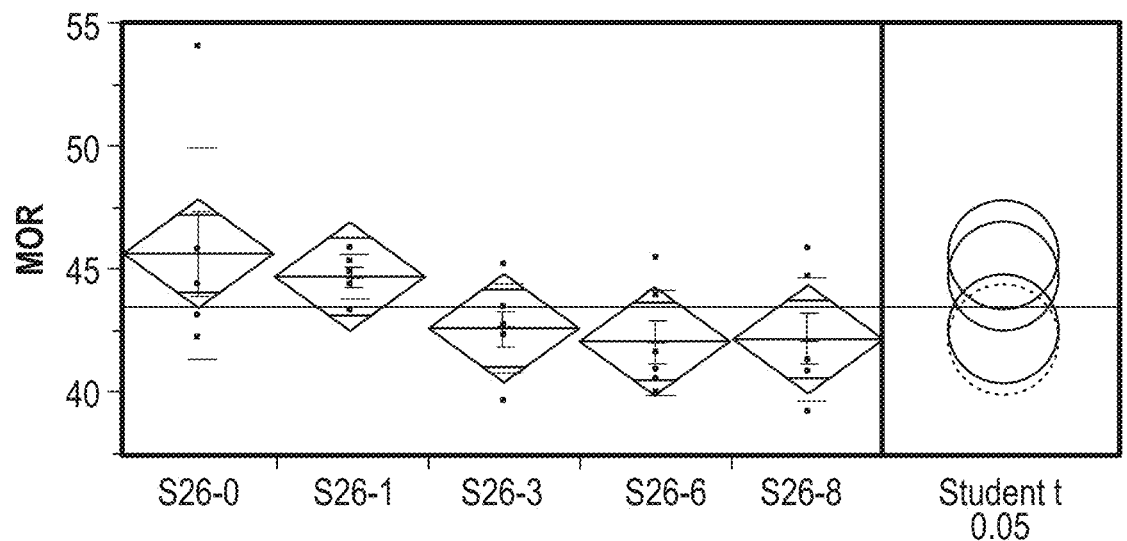

Briefly turning to FIG. 9, a scanning electron microscope image of a cross section of an exemplary bonded abrasive body 900 is included. The body 900 includes abrasive particles 902 contained in the bond material 904 and pores 906. The pores 906 are at least partially defined by the layer 910 including ceramic particles 908.

In an embodiment, the content of the ceramic particles in the bonded abrasive body, $W_{c/b}$, can be determined by using the formula $W_{c/b}=[W_{cb}/(W_{cb}+W_b)]\times 100\%$, wherein $W_{c/b}$ is the content of ceramic particles in weight percentages in the bonded abrasive body, $W_{cb}$ is the weight of ceramic particles in the bonded abrasive body, and $W_b$ is the weight of the bond material in the bonded abrasive body.

In a further embodiment, the body can include a certain content, $W_{c/b}$, of the ceramic particles. In an aspect, the body can include the content $W_{c/b}$ of at least 0.0005 wt %, such as at least 0.0008 wt %, at least 0.001 wt %, at least 0.002 wt %, at least 0.004 wt %, at least 0.006 wt %, at least 0.008 wt %, at least 0.01 wt %, at least 0.02 wt %, at least 0.05 wt %, at least 0.08 wt %, at least 0.1 wt %, at least 0.2 wt %, at least 0.4 wt %, at least 0.5 wt %, at least 0.7 wt %, at least 0.8 wt %, at least 0.9 wt %, at least 1 wt %, at least 1.2 wt %, at least 1.4 wt %, at least 1.6 wt %, at least 1.8 wt %, at least 2 wt %, at least 2.2 wt %, at least 2.5 wt %, at least 2.7 wt %, at least 3 wt %, at least 3.3 wt %, at least 3.5 wt %, at least 3.7 wt %, at least 3.9 wt %, at least 4 wt %, at least 4.1 wt %, at least 4.3 wt %, at least 4.5 wt %, at least 4.7 wt %, at least 4.9 wt %, at least 5 wt %, at least 6 wt %, at least 7 wt %, at least 9 wt %, at least 10 wt %, at least 12 wt %, at least 15 wt %, at least 17 wt %, at least 19 wt %, at least 20 wt %, at least 22 wt %, at least 25 wt %, at least 28 wt %, or at least 30 wt %. In another aspect, the content of the ceramic particles $W_{c*b}$ can be less than 50 wt %, such as at most 45 wt %, at most 43 wt %, at most 41 wt %, at most 39 wt %, at most 37 wt %, at most 35 wt %, at most 33 wt %, at most 31 wt %, at most 28 wt %, at most 26 wt %, at most 24 wt %, at most 22 wt %, at most 20 wt %, at most 18 wt %, at most 17 wt %, at most 15 wt %, at most 13 wt %, at most 11 wt %, at most 10 wt %, at most 9.7 wt %, at most 9.5 wt %, at most 9.4 wt %, at most 9.2 wt %, at most 9 wt %, at most 8.8 wt %, at most 8.6 wt %, at most 8.3 wt %, at most 8 wt %, at most 7.9 wt %, at most 7.7 wt %, at most 7.5 wt %, at most 7.3 wt %, at most 7 wt %, at most 6.9 wt %, at most 6.7 wt %, at most 6.6 wt %, at most 6.4 wt %, at most 6.2 wt %, at most 6 wt %, at most 5.8 wt %, at most 5.6 wt %, at most 5.4 wt %, at most 5.2 wt %, at most 5 wt %, at most 4.8 wt %, at most 4.6 wt %, at most 4.1 wt %, at most 3.9 wt %, at most 3.5 wt %, at most 3.3 wt %, at most 3 wt %, at most 2.7 wt %, at most 2.5 wt %, at most 2.2 wt %, at most 2 wt %, at most 1.5 wt %, or at most 1 wt %. Moreover, the content of the ceramic particles $W_{c/b}$ can be in a range including any of the minimum and maximum percentages noted herein.

In a further embodiment, the body can include a certain content, $V_{c/b}$, of the ceramic particles. As used herein, the volume percentage of ceramic particles included in the bond material, $V_{c/b}$, can be determined by using the formula $V_{c/b}=[V_{cm}/(V_{cm}+V_{bm})]\times 100\%$, wherein $V_{cm}$ is the volume of ceramic particles and $V_{bm}$ is the volume of the bond material in the abrasive body. In an aspect, the content of the ceramic particles $V_{c/b}$ can be at least 1 vol %, such as at least 1.3 vol %, at least 1.5 vol %, at least 1.8 vol %, at least 2 vol %, at least 2.2%, at least 2.5 vol %, at least 2.7 vol %, at least 3 vol %, at least 3.3 vol %, at least 3.5 vol %, at least 3.7 vol %, at least 3.9 vol %, at least 4 vol %, at least 4.1 vol %, at least 4.3 vol %, at least 4.5 vol %, at least 4.7 vol %, at least 4.9 vol %, at least 5 vol %, at least 6 vol %, or at least 7 vol %. In another aspect, the content of the ceramic particles $V_{c/b}$ can be at most 15 vol %, such as at most 12 vol %, at most 11 vol %, or at most 10 vol %. In certain aspect, the content of the ceramic particles $V_{c/b}$ can be less than 10 vol %, such as at most 9.7 vol %, at most 9.5 vol %, at most 9.4 vol %, at most 9.2 vol %, at most 9 vol %, at most 8.8 vol %, at most 8.6 vol %, at most 8.3 vol %, at most 8 vol %, at most 7.9 vol %, at most 7.7 vol %, at most 7.5 vol %, at most 7.3 vol %, at most 7 vol %, at most 6.9 vol %, at most 6.7 vol %, at most 6.6 vol %, at most 6.4 vol %, at most 6.2 vol %, at most 6 vol %, at most 5.8 vol %, at most 5.6 vol %, at most 5.4 vol %, at most 5.2 vol %, at most 5 vol %, at most 4.8 vol %, at most 4.6 vol %, at most 4.3 vol %, or at most 4 vol %. Moreover, the content of the ceramic particles $V_{c/b}$ can be in a range including any of the minimum and maximum percentages noted herein.

As used the herein, a particle size is intended to refer to a major dimension (i.e., length) of the particle. For example, the abrasive body can include ceramic particles having average length having the values noted with respect to the ceramic particle sizes described in embodiments herein. It can be appreciated the length would be the diameter of a particle when the particle is spherical. In this disclosure, particle sizes (e.g., D50, D10, and D90) of abrasive particles and ceramic particles in the abrasive body may be determined by measuring the sizes of all the particles of at least 7 images of cross sections of the abrasive body to have statistical significance. Image Pro Plus of version 6.2 from Media Cybernetics or another software having equivalent function can be used for determining particle sizes.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. An abrasive article, comprising:
a body including:
 a bond material extending through at least a portion of the body;
 abrasive particles contained in the body, the abrasive particles having an average particle size (D50a) of at least 100 microns; and
ceramic particles contained in the bond material, wherein the ceramic particles comprise an average particle size (D50c) of greater than 12 microns and at most 75 microns.

Embodiment 2. An abrasive article, comprising:
a body including:
 a bond material comprising a vitreous phase;
 abrasive particles contained in the body, the abrasive particles having an average abrasive particle size (D50a); and
 ceramic particles contained in the bond material, wherein the ceramic particles comprise an average particle size (D50c);
wherein the bond material comprises an average bond post size (Sbp) and wherein D50c<Sbp<D50a.

Embodiment 3. An abrasive article, comprising:
a body including:
 a bond material comprising a vitreous phase;
 abrasive particles contained in the body, the abrasive particles having an average abrasive particle size (D50a); and
 ceramic particles contained in the bond material, wherein the ceramic particles comprise an average particle size (D50c), wherein D50c<D50a;
wherein the bond material comprises an average Vickers hardness of at least 5.70 GPa.

Embodiment 4. An abrasive article, comprising:
a body including:
 a bond material comprising a vitreous phase;
 abrasive particles contained in the body, the abrasive particles having an average abrasive particle size (D50a); and ceramic particles contained in the bond material, wherein the ceramic particles comprise an average particle size (D50c), wherein D50c<D50a;

wherein the body comprises an average MOR of at least 38 MPa.

Embodiment 5. An abrasive article, comprising:
a body including:
a bond material comprising a vitreous phase;
abrasive particles contained in the body, the abrasive particles having an average abrasive particle size (D50a); and
pores surrounded by ceramic particles contained in the bond material, wherein the ceramic particles comprise an average particle size (D50c), wherein D50c<D50a.

Embodiment 6. The abrasive article of embodiment 1, wherein the bond material comprises a vitreous phase.

Embodiment 7. The abrasive article of any one of embodiments 1 to 6, wherein the bond material is essentially free of an organic material.

Embodiment 8. The abrasive article of any one of embodiments 1 to 7, wherein the ceramic particles comprises the average particle size (D50c) of greater than 12 microns, at least 13 microns, at least 14 microns, at least 15 microns, at least 16 microns, at least 17 microns, at least 18 microns, at least 19 microns, at least 20 microns, at least 21 microns, at least 22 microns, at least 23 microns, at least 24 microns, at least 25 microns, at least 26 microns, at least 37 microns, at least 38 microns, at least 39 microns, at least 40 microns, at least 41 microns, at least 42 microns, at least 43 microns, at least 44 microns, at least 45 microns, at least 46 microns, at least 47 microns, at least 48 microns, at least 49 microns, at least 50 microns, at least 51 microns, at least 52 microns, at least 53 microns, at least 54 microns, at least 55 microns, at least 56 microns, at least 57 microns, at least 58 microns, at least 59 microns, at least 60 microns, at least 61 microns, at least 62 microns, at least 63 microns, at least 64 microns, at least 65 microns, at least 66 microns, at least 67 microns, at least 68 microns, at least 69 microns, or at least 70 microns.

Embodiment 9. The abrasive article of any one of embodiments 1 to 8, wherein the ceramic particles comprises the average particle size (D50c) of at most 75 microns, at most 74 microns, at most 73 microns, at most 72 microns, at most 71 microns, at most 70 microns, at most 69 microns, at most 68 microns, at most 67 microns, at most 66 microns, at most 65 microns, at most 64 microns, at most 63 microns, at most 62 microns, at most 61 microns, at most 60 microns, at most 59 microns, at most 58 microns, at most 57 microns, at most 56 microns, at most 55 microns, at most 54 microns, at most 53 microns, at most 52 microns, at most 51 microns, at most 50 microns, at most 49 microns, at most 48 microns, at most 47 microns, at most 46 microns, at most 45 microns, at most 44 microns, at most 43 microns, at most 42 microns, at most 41 microns, at most 40 microns, at most 39 microns, at most 38 microns, at most 37 microns, at most 36 microns, at most 35 microns, at most 34 microns, at most 33 microns, at most 32 microns, at most 31 microns, at most 30 microns, at most 29 microns, at most 28 microns, at most 27 microns, at most 26 microns, at most 25 microns, at most 24 microns, at most 23 microns, or at most 22 microns.

Embodiment 10. The abrasive article of any one of embodiments 1 to 9, wherein the ceramic particles comprises the average particle size (D50c) in a range of at least 6 microns to 80 microns, in a range of 6 microns to 69 microns, in a range of greater than 12 microns to 75 microns, in a range from 13 microns to 70 microns, in a range from 15 microns to 55 microns, in a range from 17 microns to 45 microns, in a range from 20 microns to 42 microns, or in a range from 22 microns to 38 microns.

Embodiment 11. The abrasive article of any one of embodiments 1 to 10, wherein the body comprises a ratio, D50a/D50c, of the average particle size of the abrasive particles (D50a) to the average particle size of the ceramic particles (D50c) of at least 4, at least 4.2, at least at least 4.5, at least 4.8, at least 5, at least 5.2, at least 5.4, at least 5.6, at least 5.9, at least 6.2, at least 6.5, at least 6.8, at least 7, at least 7.2, at least 7.6, at least 8, at least 8.2, at least 8.5, at least 8.8, at least 9, at least 9.2, at least 9.5, at least 9.7, at least 9.9, at least 10.1, at least 10.5, at least 10.8, at least 10.9, at least 11, at least 11.1, at least 11.2, at least 11.5, at least 11.7, at least 11.9, at least 12.1, at least 12.3, at least 12.7, at least 13, at least 13.2, at least 13.4, at least 13.6, at least 13.9, at least 14, at least 14.2, at least 14.3, at least 14.5, at least 14.7, at last 14.9, at least 15, at least 15.2, at least 15.3, at least 15.5, at least 15.7, at least 16, at least 16.2, at least 16.4, at least 16.6, at least 16.9, at least 17, at least 17.2, at least 17.3, at least 17.5, at least 17.7, at last 17.9, at least 18, at least 18.2, at least 18.3, at least 18.5, at least 18.7, at least 19, at least 19.2, at least 19.4, at least 19.6, at least 19.9, at least 20, at least 20.2, at least 20.4, at least 20.5, at least 20.7, at last 21, at least 21.5, at least 21.7, at least 21.9, at least 22, at least 22.3, at least 22.5, at least 22.8, at least 23, at least 23.2, at least 23.6, at least 24, at least 24.2, at least 24.5, at least 24.7, at least 25, at least 25.3, at least 25.5, at least 25.7, at least 26, at least 26.2, at least 26.4, at least 26.6, at least 26.9, at least 27, at least 27.2, at least 27.3, at least 27.5, at least 27.7, at last 27.9, at least 28.1, at least 28.2, at least 28.5, at least 28.7, at least 29, at least 29.1, at least 29.4, at least 29.6, at least 29.8, at least 30, at least 30.2, at least 30.4, at least 30.5, at least 30.7, at last 30.9, at least 31, at least 31.2, at least 31.3, at least 31.5, at least 31.7, at least 31.9, at least 32, at least 32.2, at least 32.4, at least 32.7, at least 33, at least 33.4, at least 33.6, at least 33.9, at least 34, at least 34.2, at least 34.5, at least 34.7, at last 34.9, at least 35, at least 35.2, at least 35.5, at least 35.8, at least 36, at least 36.2, at least 36.5, at least 36.7, at least 37, at least 37.2, at least 37.4, at least 37.6, at least 37.9, at least 38, at least 38.3, at least 38.5, at least 38.7, at last 39, at least 39.3, at least 39.5, at least 39.7, at least 40, at least 40.2, at least 40.5, at least 40.7, at least 41, at least 41.2, at least 41.4, at least 41.6, at least 41.9, at least 42, at least 42.3, at least 42.5, at least 42.7, at last 42.9, at least 43, at least 43.2, at least 42.3, at least 42.5, at least 42.7, at least 43, at least 43.2, at least 43.4, at least 43.6, at least 43.9, at least 44, at least 44.2, at least 44.3, at least 44.5, at least 44.7, at last 44.9, or at least 45.

Embodiment 12. The abrasive article of any one of embodiments 1 to 11, wherein the body comprises a ratio, D50a/D50c, of the average particle size of the abrasive particles (D50a) to the average particle size of the ceramic particles (D50c) of at most 35, at most 34.8, at most 34.5, at most 34.2, at most 34, at most 33.8, at most 33.5, at most 33.2, at most 33, at most 32.7, at most 32.5, at most 32.1, at most 31.8, at most 31.5, at most 31, at most 30.5, at most 30, at most 29.6, at most 29.3, at most 29, at most 28.6, at most 28.3, at most 28, at most 27.6, at most 27.3, at most 27, at most 26.6, at most 26.3, at most 26, at most 25.7, at most 25.3, at most 25, at most 24.8, at most 24.5, at most 24.2, at most 24, at most 23.7, at most 23.4 at most 23, at most 22.8, at most 22.5, at most 22.1, at most 21.8, at most 21.5, at most 21, at most 20.5, at most 20, at most 19.6, at most 19.3, at most 19, at most 18.8, at most 18.6, at most 18.3, at most 18, at most 17.6, at most 17.2, at most 17, at most 16.6, at most 16.3, at most 16, at most 15.7, at most 15.3, at most 15, at most 14.8, at most 14.5, at most 14.2, at most 14, at most 13.7, at most 13.5, at most 13.3, at most 13, at most 12.5, at most 12.3, at most 12, at most 11.8, at most 11.5, at most 11.3, at most 11, at most 10.9, at most 10.7, at most 10.6, at most 10.3, at most 10, at most 9.8, at most 9.6, at most 9.5, at most 9.2, or at most 9.

Embodiment 13. The abrasive article of any one of embodiments 1 to 12, wherein the ceramic particles comprise a crystalline material, an amorphous material, or a combination thereof.

Embodiment 14. The abrasive article of any one of embodiments 1 to 13, wherein the ceramic particles comprise a polycrystalline material comprising an average crystallite size of at least 0.005 microns, at least 0.01 microns, at least 0.02 microns, at least 0.03 microns, at least 0.04 microns, at least 0.05 microns, at least 0.06 microns, at least 0.07 microns, at least 0.08 microns, at least 0.09 microns, at least 0.1 microns, at least 0.11 microns, at least 0.12 microns, at least 0.13 microns, at least 0.14 microns, at least 0.15 microns, at least 0.16, at least 0.17 microns, at least 0.18 microns, at least 0.19 microns, at least 0.2 microns, at least 0.3 microns, at least 0.4 microns, at least 0.5 microns, at least 0.6, at least 0.7 microns, at least 0.8 microns, at least 0.9 microns, at least 1 microns, at least 1.3 microns, at least 1.5 microns, at least 1.8 microns, at least 2 microns, at least 3 microns, at least 4 microns, or at least 5 microns.

Embodiment 15. The abrasive article of any one of embodiments 1 to 14, wherein the ceramic particles comprise a polycrystalline material comprising an average crystallite size of at most 75 microns, at most 60 microns, at most 50 microns, at most 40 microns, at most 30 microns, at most 20 microns, at most 10 microns, at most 9 microns, at most 8 microns, at most 7 microns, at most 6 microns, at most 5 microns, at most 4 microns, at most 3 microns, at most 2 microns, at most 1.5 microns, at most 1 microns, at most 0.9 microns, at most 0.8 microns, at most 0.7 microns, at most 0.6 microns, at most 0.5 microns, at most 0.4 microns, at most 0.3 microns, at most 0.2 microns, at most 0.1 microns, at most 0.09 microns, at most 0.08 microns, at most 0.07 microns, at most 0.06 microns, at most 0.05 microns, at most 0.04 microns, at most 0.03 microns, at most 0.02 microns, or at most 0.01 microns.

Embodiment 16. The abrasive article of any one of embodiments 1 to 15, wherein the ceramic particles comprise an oxide, a carbide, a nitride, borides, oxycarbides, oxynitrides, silicates, or any combination thereof.

Embodiment 17. The abrasive article of any one of embodiments 1 to 16, wherein the ceramic particles comprise silicon dioxide, silicon carbide, alumina, zirconia, rare earth-containing materials, cerium oxide, sol-gel derived particles, iron oxide, glass-containing particles, and a combination thereof.

Embodiment 18. The abrasive article of any one of embodiments 1 to 17, wherein the ceramic particles comprise alumina.

Embodiment 19. The abrasive article of any one of embodiments 1 to 18, wherein the ceramic particles comprise fused alumina, sol-gel alumina, microcrystalline alumina, nanocrystalline alumina, or any combination thereof.

Embodiment 20. The abrasive article of any one of embodiments 1 to 19, wherein the ceramic particles comprise fused alumina.

Embodiment 21. The abrasive article of any one of embodiments 1 to 20, wherein the ceramic particles consist essentially of fused alumina.

Embodiment 22. The abrasive article of any one of embodiments 1 to 21, wherein the ceramic particles consist essentially of white fused alumina.

Embodiment 23. The abrasive article of any one of embodiments 1 to 22, wherein the ceramic particles consist essentially of alpha-alumina.

Embodiment 24. The abrasive article of any one of embodiments 1 to 23, wherein the ceramic particles comprises a Mohs' hardness of at least 5.5, at least 6, at least 6.5, at least 7, at least 7.5, at least 8, at least 8.5, or at least 9.

Embodiment 25. The abrasive article of any one of embodiments 1 to 24, wherein the ceramic particles comprises a Mohs' hardness of at most 10, at most 9.5, at most 9, at most 8.5, at most 8, at most 7.5, or at most 7.

Embodiment 26. The abrasive article of any one of embodiments 1 to 25, wherein the ceramic particles comprises a particle size distribution including a D10 of at least 3 microns, at least 5 microns, at least 5.5 microns, at least 6 microns, at least 6.5 microns, at least 7 microns, at least 7.5 microns, at least 8 microns, at least 8.3 microns, at least 8.5 microns, at least 8.8 microns, at least 9 microns, at least 9.2 microns, at least 9.4 microns, at least 9.6 microns, at least 9.8 microns, at least 10 microns, at least 10.5 microns, at least 10.8 microns, at least 11 microns, at least 11.3 microns, at least 11.5 microns, at least 11.8 microns, or at least 12 microns.

Embodiment 27. The abrasive article of any one of embodiments 1 to 26, wherein the ceramic particles comprises a particle size distribution including a D10 of at most 38 microns, at most 35 microns, at most 33 microns, at most 31 microns, at most 30 microns, at most 28 microns, at most 27 microns, at most 25 microns, at most 23 microns, at most 20 microns, at most 18 microns, at most 16 microns, at most 14 microns, or at most 13 microns.

Embodiment 28. The abrasive article of any one of embodiments 1 to 27, wherein the ceramic particles comprises a particle size distribution including a D90 of at least 15 microns, at least 17 microns, at least 19 microns, at least 20 microns, at least 22 microns, at least 23 microns, at least 24 microns, at least 27 microns, at least 29 microns, at least 30 microns, at least 31 microns, at least 33 microns, at least 35 microns, at least 37 microns, at least 38 microns, at least 40 microns, at least 41 microns, or at least 42 microns.

Embodiment 29. The abrasive article of any one of embodiments 1 to 28, wherein the ceramic particles comprises a particle size distribution including a D90 of at most 120 microns, at most 110 microns, at most 100 microns, at most 90 microns, at most 88 microns, at most 85 microns, at most 83 microns, at most 80 microns, at most 78 microns, at most 76 microns, at most 74 microns, at most 72 microns, at most 70, microns, at most 68 microns, at most 66 microns, at most 64 microns, at most 62 microns, at most 60, microns, at most 58 microns, at most 56 microns, at most 54 microns, at most 52 microns, at most 50 microns, at most 48 microns, at most 46 microns, at most 45 microns, at most 44 microns, or at most 43 microns.

Embodiment 30. The abrasive article of any one of embodiments 1 to 29, wherein the abrasive particles have an average particle size (D50a) of at least 120 microns, at least 140 microns, at least 150 microns, at least 170 microns, at least 180 microns, at least 200 microns, at least 210 microns, at least 230 microns, at least 250 microns, at least 260 microns, at least 270 microns, at least 290 microns, at least 300 microns, at least 320 microns, at least 340 microns, at least 350 microns, at least 360 microns, at least 380 microns, at least 400 microns, at least 420 microns, at least 430 microns, at least 440 microns, at least 450 microns, at least 460 microns, at least 470 microns, at least 490 microns, or at least 500 microns.

Embodiment 31. The abrasive article of any one of embodiments 1 to 30, wherein the abrasive particles have an average particle size (D50a) of at most 1.9 mm, at most 1.8 mm, at most 1.6 mm, at most 1.5 mm, at most 1.2 mm, at most 1 mm, at most 900 microns, at most 850 microns, at most 830 microns, at most 800 microns, at most 750 microns, at most 700 microns, at most 650 microns, at most 600 microns, at most 550 microns, at most 500 microns, at most 450 microns, at most 400 microns, at most 380 microns, at most 350 microns, at most 320 microns, at most 300 microns, at most 280 microns, at most 260 microns, or at most 255 microns.

Embodiment 32. The abrasive article of any one of embodiments 1 to 31, wherein the abrasive particles comprises a particle size distribution including a D10 of at least 60 microns, at least 65 microns, at least 70 microns, at least 75 microns, at least 80 microns, at least 85 microns, at least 90 microns, at least 95 microns, at least 100 microns, at least 110 microns, at least 120 microns, at least 130 microns, at least 135 microns, at least 140 microns, at least 145 microns, at least 150 microns, at least 155 microns, at least 160 microns, or at least 165 microns.

Embodiment 33. The abrasive article of any one of embodiments 1 to 32, wherein the abrasive particle Embodiment s comprises a particle size distribution including a D10 of at most 1 mm, at most 900 microns, at most 850 microns, at most 830 microns, at most 800 microns, at most 750 microns, at most 700 microns, at most 650 microns, at most 600 microns, at most 550 microns, at most 500 microns, at most 450 microns, at most 400 microns, at most 380 microns, at most 350 microns, at most 320 microns, at most 300 microns, at most 280 microns, at most 260 microns, at most 250 microns, at most 240 microns, at most 220 microns, at most 210 microns, at most 200 microns, or at most 170 microns.

Embodiment 34. The abrasive article of any one of embodiments 1 to 33, wherein the abrasive particles comprises a particle size distribution including a D90 of at least 150 microns, at least 170 microns, at least 190 microns, at least 200 microns, at least 220 microns, at least 240 microns, at least 250 microns, at least 260 microns, at least 270 microns, at least 280 microns, at least 300 microns, at least 310 microns, at least 320 microns, at least 340 microns, at least 350 microns, at least 360 microns, or at least 370 microns.

Embodiment 35. The abrasive article of any one of embodiments 1 to 34, wherein the abrasive particles comprises a particle size distribution including a D90 of at most 2.2 mm, at most 2 mm, at most 1 mm, at most 900 microns, at most 870 microns, at most 850 microns, at most 820 microns, at most 780 microns, at most 750 microns, at most 730 microns, at most 700 microns, at most 670 microns, at most 640 microns, at most 610 microns, at most 580 microns, at most 530 microns, at most 500 microns, at most 470 microns, at most 450 microns, at most 330 microns, at most 410 microns, at most 390 microns, or at most 370 microns.

Embodiment 36. The abrasive article of any one of embodiments 1 to 35, wherein the bond material comprises a ceramic material, an amorphous material, or a combination thereof.

Embodiment 37. The abrasive article of any one of embodiments 1 to 36, wherein the bond material comprises at most 30 wt % boron oxide ($B_2O_3$) for a total weight of the bond material, at most 28 wt %, at most 26 wt %, at most 24 wt %, or at most 22 wt %.

Embodiment 38. The abrasive article of any one of embodiments 1 to 37, wherein the bond material comprises at least 5 wt % boron oxide ($B_2O_3$) for the total weight of the bond material, at least 8 wt %, at least 10 wt %, at least 12 wt %, or at least 15 wt %.

Embodiment 39. The abrasive article of any one of embodiments 1 to 38, wherein the bond material comprises at most 80 wt % silicon oxide ($SiO_2$) for the total weight of the bond material, at most 75 wt %, at most 70 wt %, at most 69 wt %, at most 66 wt %, at most 65 wt %, at most 60 wt %, at most 55 wt %, at most 52 wt %, or at most 50 wt %.

Embodiment 40. The abrasive article of any one of embodiments 1 to 39, wherein the bond material comprises at least 25 wt % silicon oxide ($SiO_2$) for the total weight of the bond material, at least 35 wt %, at least 38 wt %, or at least 40 wt %.

Embodiment 41. The abrasive article of any one of embodiments 1 to 40, wherein the bond comprises boron oxide ($B_2O_3$) and silicon oxide ($SiO_2$), and wherein the total content of boron oxide and silicon oxide is at most 80 wt %, at most 77 wt %, at most 75 wt %, at most 73 wt %, at most 70 wt %, at most 70 wt %, or at most 65 wt %.

Embodiment 42. The abrasive article of any one of embodiments 1 to 41, wherein the bond comprises boron oxide ($B_2O_3$) and silicon oxide ($SiO_2$), and wherein the total content of boron oxide and silicon oxide is at least 40 wt %, at least 42 wt %, at least 46 wt %, at least 48 wt %, or at least 50 wt %.

Embodiment 43. The abrasive article of any one of embodiments 1 to 42, the bond material comprises a ratio of weight percent silicon oxide ($SiO_2$):weight percent boron oxide ($B_2O_3$) of at most 7:1, at most 6.5:1, at most 6:1, at most 5.5:1, at most 5.2:1, at most 5:1, or at most 4.8:1.

Embodiment 44. The abrasive article of any one of embodiments 1 to 43, wherein the bond material comprises a ratio of weight percent silicon oxide ($SiO_2$):weight percent boron oxide ($B_2O_3$) of at least 1.3:1, at least 1.5:1, at least 1.7:1, at least 2.0:1, at least 2.2:1, at least 2.4:1, at least 2.6:1, at least 2.8:1, or at least 3:1.

Embodiment 45. The abrasive article of any one of embodiments 1 to 44, wherein the bond comprises at least 8 wt % aluminum oxide ($Al_2O_3$) for a total weight of the bond material, at least 9 wt %, at least 10 wt %, at least 12 wt %, or at least 14 wt %.

Embodiment 46. The abrasive article of any one of embodiments 1 to 45, wherein the bond comprises at most 30 wt % aluminum oxide ($Al_2O_3$) for a total weight of the bond material, at most 28 wt %, at most 25 wt %, at most 23 wt %, or at most 20 wt %.

Embodiment 47. The abrasive article of any one of embodiments 1 to 46, wherein the bond comprises aluminum oxide ($Al_2O_3$) and silicon oxide ($SiO_2$), and wherein the total content of aluminum oxide and silicon oxide is at least 50 wt % for a total weight of the bond material, at least 52 wt %, at least 56 wt %, at least 58 wt %, or at least 60 wt %.

Embodiment 48. The abrasive article of any one of embodiments 1 to 47, wherein the bond comprises aluminum oxide ($Al_2O_3$) and silicon oxide ($SiO_2$), and wherein the total content of aluminum oxide and silicon oxide is at most 80 wt % for a total weight of the bond material, at most 77 wt %, at most 75 wt %, or at most 73 wt %.

Embodiment 49. The abrasive article of any one of embodiments 1 to 48, wherein the bond material comprises a ratio of weight percent silicon oxide ($SiO_2$):weight percent aluminum oxide (Al₂O₃) of at most 5.5:1, at most 5:1, at most 4.5:1, at most 4:1, at most 3.5:1, at most 3:1, at most 2.5:1, at most 2.2:1, or at most 2:1.

Embodiment 50. The abrasive article of any one of embodiments 1 to 49, wherein the bond material comprises a ratio of weight percent silicon oxide (SiO₂):weight percent aluminum oxide (Al₂O₃) of at least 1.3:1, at least 1.5:1, at least 1.7:1, or at least 2:1.

Embodiment 51. The abrasive article of any one of embodiments 1 to 50, wherein the bond material comprises a polycrystalline phase including zircon (ZrSiO₄).

Embodiment 52. The abrasive article of any one of embodiments 1 to 51, wherein the bond material comprises at least 15 wt % zircon for a total weight of the bond material, at least 17 wt %, at least 19 wt %, at least 20 wt %, at least 21 wt %, at least 22 wt %, at least 23 wt %, or at least 24 wt % for a total weight of the bond material.

Embodiment 53. The abrasive article of any one of embodiments 1 to 52, wherein the bond material comprises at most 44 wt % zircon, at most 42 wt %, at most 40 wt %, at most 38 wt %, at most 36 wt %, at most 35 wt %, at most 34 wt %, at most 33 wt %, or at most 32 wt %.

Embodiment 54. The abrasive article of any one of embodiments 1 to 53, wherein the bond is essentially free of zircon (ZrSiO₄).

Embodiment 55. The abrasive article of any one of embodiments 1 to 54, wherein the bond material comprises at least one alkaline earth oxide compound (RO), and wherein the total content of alkaline earth oxide compounds (RO) is at most 6 wt % for a total weight of the bond material, at most 5 wt %, at most 4 wt %, at most 3.0 wt %, at most 2.5 wt %, or at most 2 wt %.

Embodiment 56. The abrasive article of any one of embodiments 1 to 55, wherein the bond material comprises at least one alkaline earth oxide compound (RO), and wherein the total content of alkaline earth oxide compounds (RO) is at least 0.5 wt % or at least 0.8 wt %.

Embodiment 57. The abrasive article of any one of embodiments 1 to 56, wherein the bond material comprises at most 3 different alkaline earth oxide compounds (RO) selected from the group of calcium oxide (CaO), magnesium oxide (MgO), barium oxide (BaO), strontium oxide (SrO).

Embodiment 58. The abrasive article of any one of embodiments 1 to 57, wherein the bond material comprises at least 0.5 wt % calcium oxide (CaO) for a total weight of the bond material, at least 0.8 wt %, or at least 1 wt %.

Embodiment 59. The abrasive article of any one of embodiments 1 to 58, wherein the bond material is essentially free of calcium oxide (CaO).

Embodiment 60. The abrasive article of any one of embodiments 1 to 59, wherein the bond material comprises at most 3 wt % calcium oxide (CaO) for a total weight of the bond material, at most 2.8 wt %, or at most 2.5 wt %, at most 2 wt %, or at most 1.7 wt %.

Embodiment 61. The abrasive article of any one of embodiments 1 to 60, wherein the bond material comprises an alkali oxide compound (R₂O) selected from the group of compounds consisting of lithium oxide (Li₂O), sodium oxide (Na₂O), potassium oxide (K₂O), and cesium oxide (Cs₂O) and a combination thereof.

Embodiment 62. The abrasive article of any one of embodiments 1 to 61, wherein the bond material comprises at least one alkali oxide compound (R₂O), and wherein the total content of the alkali oxide compounds (RO) is at most 25 wt %, or at most 22 wt % or at most 20 wt %.

Embodiment 63. The abrasive article of any one of embodiments 1 to 62, wherein the bond material comprises at least one alkali oxide compound (R₂O), and wherein the total content of the alkali oxide compounds (R₂O) is at least 3 wt %, at least 5 wt %, at least 7 wt %, or at least 9 wt %.

Embodiment 64. The abrasive article of any one of embodiments 1 to 63, wherein the bond material comprises at least 1 wt % lithium oxide (Li₂O) for a total weight of the bond material, at least 1.5 wt %, or at least 2 wt %.

Embodiment 65. The abrasive article of any one of embodiments 1 to 64, wherein the bond material is essentially free of lithium oxide (Li₂O).

Embodiment 66. The abrasive article of any one of embodiments 1 to 65, wherein the bond material comprises at most 7 wt % lithium oxide (Li₂O) for a total weight of the bond material, at most 6.5 wt %, at most 6 wt %, at most 5.5 wt %, or at most 5 wt %.

Embodiment 67. The abrasive article of any one of embodiments 1 to 66, wherein the bond material comprises at least 3 wt % sodium oxide (Na₂O) for a total weight of the bond material, at least 4 wt %, or at least 5 wt %.

Embodiment 68. The abrasive article of any one of embodiments 1 to 67, wherein the bond material comprises at most 15 wt % sodium oxide (Na₂O) for a total weight of the bond material, at most 14 wt %, at most 13 wt %, at most 12 wt %, at most 11 wt %, or at most 10 wt %.

Embodiment 69. The abrasive article of any one of embodiments 1 to 68, wherein the bond material comprises at least 1 wt % potassium oxide (K₂O) for a total weight of the bond material, at least 1.5 wt %, or at least 2 wt %.

Embodiment 70. The abrasive article of any one of embodiments 1 to 69, wherein the bond material comprises at least 15 wt % potassium oxide (K₂O) for a total weight of the bond material, at most 13 wt %, at most 11 wt %, at most 10 wt %, at most 8 wt %, at most 7 wt %, at most 6.5 wt %, at most 6 wt %, or at most 5.5 wt %, or at most 5 wt %.

Embodiment 71. The abrasive article of any one of embodiments 1 to 70, wherein the bond material comprises at most 3.0 wt % phosphorous oxide (P₂O₅) or wherein the bond material is essentially free of phosphorus oxide (P₂O₅).

Embodiment 72. The abrasive article of any one of embodiments 1 to 71, wherein the bond material comprises a composition essentially free of oxide compounds selected from the group consisting of TiO₂, Fe₂O₃, MnO₂, ZrSiO₂, and CoAl₂O₄.

Embodiment 73. The abrasive article of any one of embodiments 1 to 72, wherein the bond material comprises a forming temperature of at most 1250° C., at most 1200° C. or at most 1175° C. or at most 1150° C. or at most 1125° C. or at most 1100° C.

Embodiment 74. The abrasive article of any one of embodiments 1 to 73, wherein the bond material comprises a forming temperature of at least 800° C., at least 850° C., at least about 900° C., 920° C., or at least about 950° C. or at least about 975° C.

Embodiment 75. The abrasive article of any one of embodiments 1 to 74, wherein the abrasive article comprises a fixed abrasive article.

Embodiment 76. The abrasive article of any one of embodiments 1 to 75, wherein the bond material is in a for Embodiment m of a matrix extending continuously through a volume of the body.

Embodiment 77. The abrasive article of any one of embodiments 1 to 76, wherein the body comprises ceramic particles of at least 1 vol % for the total volume of the bond material, at least 1.3 vol %, at least 1.5 vol %, at least 1.8 vol %, at least 2 vol %, at least 2.2 vol %, at least 2.5 vol %, at least 2.7 vol %, at least 3 vol %, at least 3.3 vol %, at least 3.5 vol %, at least 3.7 vol %, at least 3.9 vol %, at least 4 vol %, at least 4.1 vol %, at least 4.3 vol %, at least 4.5 vol %, at least 4.7 vol %, at least 4.9 vol %, or at least 5 vol %.

Embodiment 78. The abrasive article of any one of embodiments 1 to 77, wherein the body comprises ceramic particles of less than 10 vol %, at most 9.7 vol %, at most 9.5 vol %, at most 9.4 vol %, at most 9.2 vol %, at most 9 vol %, at most 8.8 vol %, at most 8.6 vol %, at most 8.3 vol %, at most 8 vol %, at most 7.9 vol %, at most 7.7 vol %, at most 7.5 vol %, at most 7.3 vol %, at most 7 vol %, at most 6.9 vol %, at most 6.7 vol %, at most 6.6 vol %, at most 6.4 vol %, at most 6.2 vol %, at most 6 vol %, at most 5.8 vol %, at most 5.6 vol %, at most 5.4 vol %, at most 5.2 vol %, at most 5 vol %, at most 4.8 vol %, or at most 4.6 vol %.

Embodiment 79. The abrasive article of any one of embodiments 1 to 78, wherein the body comprises at least 20 vol % abrasive particles for a total volume of the body, at least 25 vol %, at least 30 vol %, or at least 35 vol %.

Embodiment 80. The abrasive article of any one of embodiments 1 to 79, wherein the body comprises at most 65 vol % abrasive particles for a total volume of the body, at most 64 vol %, or at most 62 vol % or at most 60 vol % or at most 58 vol % or at most 56 vol % or at most 54 vol % or at most 52 vol % or at most 50 vol %.

Embodiment 81. The abrasive article of any one of embodiments 1 to 80, wherein the body comprises at least 2 vol % bond material for a total volume of the body, at least 4 vol %, at least 5 vol %, at least 10 vol %, at least 20 vol %.

Embodiment 82. The abrasive article of any one of embodiments 1 to 81, wherein the body comprises at most 35 vol % or at most 30 vol % or at most 25 vol % or at most 20 vol %.

Embodiment 83. The abrasive article of any one of embodiments 1 to 82, wherein the wherein the body comprises at least 20 vol % porosity for a total volume of the body at least 22 vol %, at least 24 vol %, at least 26 vol %, at least 28 vol %, at least 30 vol %, at least 32 vol %, or at least 35 vol %.

Embodiment 84. The abrasive article of any one of embodiments 1 to 83, wherein the body comprises at most 75 vol % porosity for a total volume of the body, at most 70 vol %, at most 65 vol %, at most 60 vol %, at most 55 vol %, at most 50 vol %, at most 45 vol %, or at most 40 vol %.

Embodiment 85. The abrasive article of any one of embodiments 1 to 84, wherein the body comprises porosity comprises a type of porosity selected from the group consisting of closed porosity, open porosity, and a combination thereof.

Embodiment 86. The abrasive article of any one of embodiments 1 to 85, wherein the body comprises porosity, and wherein a majority of the porosity is open porosity or wherein essentially all of the porosity is open porosity.

Embodiment 87. The abrasive article of any one of embodiments 1 to 86, wherein the body comprises porosity and the majority of the porosity is closed porosity, wherein essentially all of the porosity is closed porosity.

Embodiment 88. The abrasive article of any one of embodiments 1 to 87, wherein the body comprises porosity having an average pore size of at most 1.9 mm, at most 1.5 mm, at most 1 mm, at most 900 microns, at most 800 microns, at most 700 microns, at most 600 microns, at most 500 microns, at most 450 microns, at most 400 microns, at most 350 microns, at most 300 microns, at most 250 microns, at most 200 microns, at most 150 microns, or at most 100 microns.

Embodiment 89. The abrasive article of any one of embodiments 1 to 88, wherein the body comprises porosity having an average pore size of at least 0.1 microns, at least 1 micron, at least 5 microns, at least 8 microns, at least 10 microns, at least 14 microns, at least 16 microns, at least 25 microns, at least 50 microns, at least 100 microns, at least 150 microns, or at least 200 microns.

Embodiment 90. The abrasive article of any one of embodiments 1 to 89, wherein the abrasive particles comprise a blend including a first type of abrasive particle and a second type of abrasive particle, wherein the first type and the second type indecently comprise at least one material selected from the group consisting of oxides, carbides, nitrides, borides, oxycarbides, oxynitrides, superabrasives, and carbon-based materials.

Embodiment 91. The abrasive article of any one of embodiments 1 to 90, wherein the abrasive particles comprise non-agglomerated particles, agglomerated particles, shaped abrasive particles, non-shaped abrasive particles, or any combination thereof.

Embodiment 92. The abrasive article of embodiment 91, wherein the shaped abrasive particles comprise a two dimensional shape selected from the group consisting of regular polygons, irregular polygons, irregular shapes, triangles, partially-concave triangles, quadrilaterals, rectangles, trapezoids, pentagons, hexagons, heptagons, octagons, ellipses, Greek alphabet characters, Latin alphabet characters, Russian alphabet characters, and a combination thereof.

Embodiment 93. The abrasive article of embodiment 91, wherein the shaped abrasive particles comprise a three-dimensional shape selected from the group consisting of a polyhedron, a pyramid, an ellipsoid, a sphere, a prism, a cylinder, a cone, a tetrahedron, a cube, a cuboid, a rhombohedrum, a truncated pyramid, a truncated ellipsoid, a truncated sphere, a truncated cone, a pentahedron, a hexahedron, a heptahedron, an octahedron, a nonahedron, a decahedron, a Greek alphabet letter, a Latin alphabet character, a Russian alphabet character, a Kanji character, complex polygonal shapes, irregular shaped contours, a volcano shape, a monostatic shape, and a combination thereof, a monostatic shape is a shape with a single stable resting position.

Embodiment 94. The abrasive article of embodiment 93, wherein the shaped abrasive particle comprises a triangular two-dimensional shape.

Embodiment 95. The abrasive article of embodiments 91, wherein the shaped abrasive particle comprises a partially-concave triangular two-dimensional shape.

Embodiment 96. The abrasive article of any one of embodiments 91 to 95, wherein the shaped abrasive particle includes body having a body length (Lb), a body width (Wb), and a body thickness (Tb), and wherein Lb>Wb, Lb>Tb, and Wb>Tb.

Embodiment 97. The abrasive article of embodiment 96, wherein the body comprises a primary aspect ratio (Lb:Wb) of at least about 1:1 or at least about 2:1 or at least about 3:1 or at least about 5:1 or at least about 10:1, and at most 1000:1.

Embodiment 98. The abrasive article of any one of embodiments 96 to 97, wherein the body comprises a secondary aspect ratio (Lb:Tb) of at least about 1:1 or at least about 2:1 or at least about 3:1 or at least about 5:1 or at least about 10:1, and at most 1000:1.

Embodiment 99. The abrasive article of any one of embodiments 96 to 98, wherein the body comprises a tertiary aspect ratio (Wb:Tb) of at least about 1:1 or at least about 2:1 or at least about 3:1 or at least about 5:1 or at least about 10:1, and at most 1000:1.

Embodiment 100. The abrasive article of any one of embodiments 96 to 99, wherein at least one of the body length (Lb), the body width (Wb), and the body thickness (Tb) has an average dimension of at least 0.1 microns or at least 1 micron or at least 10 microns or at least 50 microns or at least 100 microns or at least 150 microns or at least 200 microns or at least 400 microns or at least 600 microns or at least 800 microns or at least 1 mm, and at most 20 mm or at most 18 mm or at most 16 mm or at most 14 mm or at most 12 mm or at most 10 mm or at most 8 mm or at most 6 mm or at most 4 mm.

Embodiment 101. The abrasive article of any one of embodiments 96 to 100, wherein the body comprises a cross-sectional shape in a plane defined by the body length and the body width selected from the group consisting of triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof.

Embodiment 102. The abrasive article of any one of embodiments 96 to 101, wherein the body comprises a cross-sectional shape in a plane defined by the body length and the body thickness selected from the group consisting of triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof.

Embodiment 103. The abrasive article of any one of embodiments 1 to 102, wherein the body comprises a filler selected from the group consisting of powders, granules, spheres, fibers, pore formers, hollow particles, and a combination thereof.

Embodiment 104. The abrasive article of any one of embodiments 1 to 103, wherein the body has a shape selected from the group consisting of wheels, hones, cones, cups, flanged-wheels, tapered cups, discs, segments, mounted points, and a combination thereof.

Embodiment 105. The abrasive article of any one of embodiments 1 to 104, wherein the bond material comprises an average bond post size (Sbp) of greater than the average particle size (D50c) of ceramic particles, wherein the average bond post size (Sbp) is greater than 12 microns, at least 13 microns, at least 15 microns, at least 17 microns, at least 19 microns, at least 20 microns, at least 22 microns, at least 24 microns, at least 25 microns, at least 26 microns, at least 37 microns, at least 38 microns, at least 39 microns, at least 40 microns, at least 42 microns, at least 45 microns, at least 47 microns, at least 49 microns, at least 51 microns, at least 53 microns, at least 55 microns, at least 57 microns, at least 59 microns, at least 62 microns, at least 65 microns, at least 67 microns, at least 70 microns, at least 74 microns, at least 76 microns, at least 78 microns, at least 80 microns, at least 82 microns, at least 84 microns, at least 87 microns, at least 90 microns, at least 93 microns, at least 95 microns, at least 98 microns, at least 100 microns, at least 110 microns, at least 120 microns, at least 140 microns, at least 160 microns, at least 180 microns, or at least 200 microns.

Embodiment 106. The abrasive article of any one of embodiments 1 to 105, wherein the bond material comprises an average bond post size (Sbp) less than the average abrasive particle size (D50a) of the abrasive particles, wherein the average bond post size (Sbp) is at most 1.8 mm, at most 1.5 mm, at most 1.2 mm, at most 900 microns, at most 850 microns, at most 830 microns, at most 800 microns, at most 750 microns, at most 700 microns, at most 650 microns, at most 600 microns, at most 550 microns, at most 500 microns, at most 450 microns, at most 400 microns, at most 380 microns, at most 350 microns, at most 320 microns, at most 300 microns, at most 280 microns, at most 260 microns, at most 255 microns, at most 220 microns, or at most 200 microns.

Embodiment 107. The abrasive article of any one of embodiments 1 to 106, wherein the bond material comprises an average Vickers hardness of at least 5.70 GPa, at least 5.75 GPa, or at least 5.80 GPa.

Embodiment 108. The abrasive article of any one of embodiments 1 to 107, wherein the bond material comprises an average Vickers hardness of at most 6.50 GPa, at most 6.45 GPa, or at most 6.40 GPa.

Embodiment 109. The abrasive article of any one of embodiments 1 to 108, wherein the body comprises an average MOR of at least 38 MPa, at least 39 MPa, at least 40 MPa, at least 41 MPa, at least 43 MPa, at least 45 MPa, at least 46 MPa, at least 47 MPa, or at least 48 MPa.

Embodiment 110. The abrasive article of any one of embodiments 1 to 109, wherein the body comprises an average MOR of at most 60 MPa, at most 58 MPa, at most 56 MPa, at most 55 MPa, at most 53 MPa, at most 52 MPa, at most 50 MPa, or at most 49 MPa.

Embodiment 111. The abrasive article of embodiment 109 or 110, wherein the body comprises for the total volume of the body:
33 vol % to 55 vol % of abrasive particles;
4 vol % to 20 vol % of the bond material; and
26 vol % to 62 vol % of porosity.

EXAMPLES

Example 1

Abrasive bar samples were made and Vickers hardness of the bond material was tested as described in embodiments herein. The samples were made following the forming process described in embodiments herein except that the samples of Sample Group 1 were formed without ceramic particles. Firstly, the bond precursor material was prepared for forming the bond composition included in Table 1. Even though some contents are provided in ranges, it is to be understood the contents of all the components add up to 100 wt %. The bond precursor was used to form all the samples, except 3 to 6 vol % of the bond precursor material was substituted with 3 to 6 vol % fused alumina particles having the average particle size D50c of 22.996 microns to form the samples of Sample Group 2. For forming the samples of Sample Group 3, 3 to 6 vol % of the bond precursor material was substituted with 3 to 6 vol % fused alumina ceramic particles having the average particle size D50c of 6.827 microns. All the samples had 44 vol % abrasive particles and 46.88 vol % of porosity for the total volume of the bonded abrasive body. The samples of Sample Group 1 had 9.12 vol % of the bond material. The samples of Sample Groups 2 and 3 had a total content of 9.12 vol % of the bond material and ceramic particles.

TABLE 1

| Component | Contents (wt %) |
|---|---|
| $SiO_2$ | 45 to 58 |
| $Al_2O_3$ | 11 to 20 |
| $Fe_2O_3$ | Up to 0.5 |
| $TiO_2$ | Up to 2 |
| CaO | Up to 4 |
| MgO | Up to 7 |
| $Li_2O$ | Up to 4 |

TABLE 1-continued

| Component | Contents (wt %) |
|---|---|
| $Na_2O$ | 3 to 12 |
| $K_2O$ | 1 to 10 |
| $B_2O_3$ | 5 to 20 |

Figure 5:
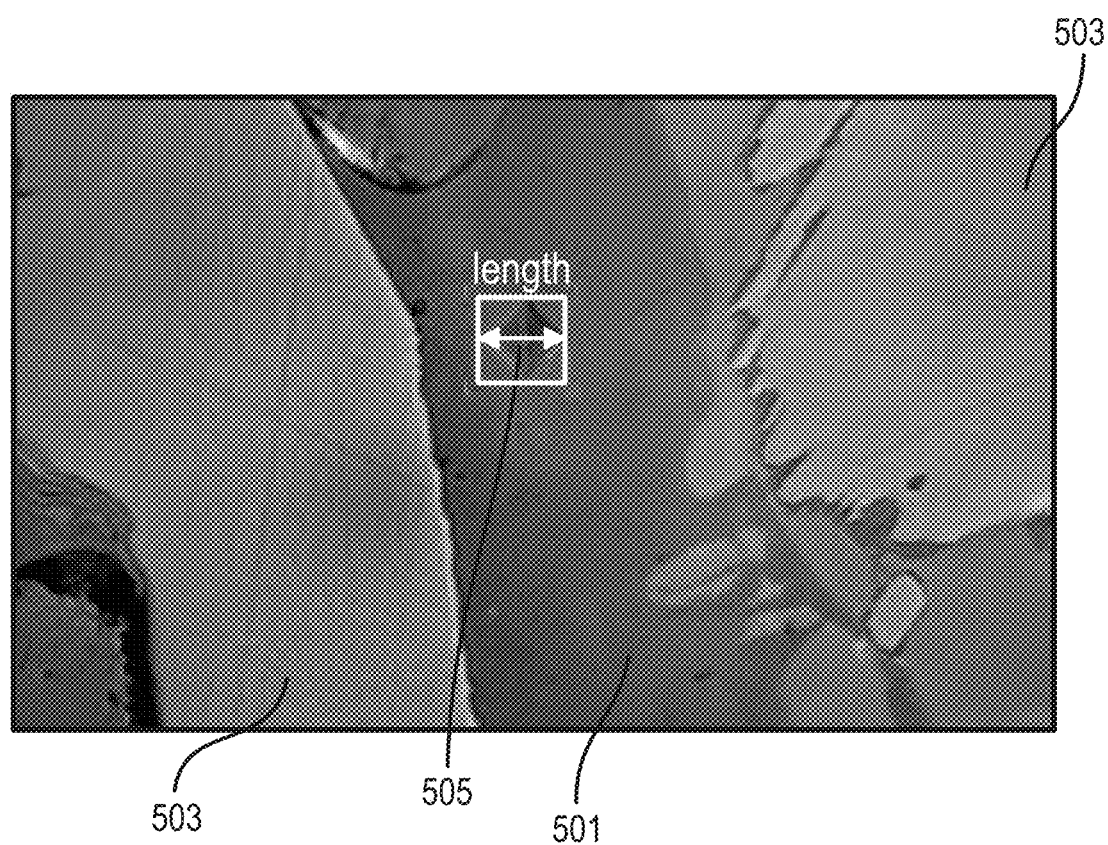
FIG. 5 includes an SEM image of a cross section of an abrasive sample.

All the samples were tested for Vickers hardness. FIG. 5 includes an image of a bar sample having an indentation 505 in the bond bridge 501 between abrasive particles 503. The indentation was caused by the Vickers hardness test. The length of the indentation as illustrated in FIG. 4 is measured using Image J. Table 2 includes average lengths and average Vickers hardness of at least 10 indentations for each tested Sample Group.

TABLE 2

| Sample Group | Average length (microns) | Average Vickers hardness (GPa) |
|---|---|---|
| 1 | 12.842 | 5.622 |
| 2 | 12.589 | 5.853 |
| 3 | 12.735 | 5.719 |

Example 2

Abrasive bar samples were made in the same manner as described in Example 1 but having the bond material composition included in Table 3. Particularly, Sample Group 4 did not include ceramic particles, and Sample Groups 5 and 6 were formed with ceramic particles in the same manner as Sample Groups 2 and 3, respectively. Sample Group 7 was formed in a similar manner as Sample Groups 2 except 9 to 12 vol % of the bond precursor material was replaced with ceramic particles. Table 4 includes ceramic particle D50 and contents for each Sample Group.

All the samples included, for the total weight of the bonded body, 44 vol % of abrasive particles and 46.88 vol % of porosity. Sample Group 1 had 9.12 vol % of the bond material for the total volume of the body. The total contents of the bond material and ceramic particles in the bonded bodies of Sample Groups 5 and 6 were the same, 9.12 vol % for the total volume of the respective body. The abrasive particles were fused alumina and had D50 of 247 microns, D10 157 microns, D90 388 microns.

TABLE 3

| Component | Contents (wt %) |
|---|---|
| $SiO_2$ | 51 to 63 |
| $Al_2O_3$ | 8 to 15 |
| $Fe_2O_3$ | Up to 1 |
| $TiO_2$ | Up to 1 |
| CaO | Up to 1 |
| MgO | Up to 1 |
| $Li_2O$ | Up to 5 |
| $Na_2O$ | 3 to 15 |
| $K_2O$ | Up to 2 |
| $B_2O_3$ | 10 to 21 |

TABLE 4

| Sample Group | Ceramic particle D50c (microns) | Ceramic particle content $V_{c/p}$ (vol %) |
|---|---|---|
| 4 | / | / |
| 5 | 22.996 | 5 |
| 6 | 6.827 | 5 |
| 7 | 22.996 | 10 |

Figure 6:
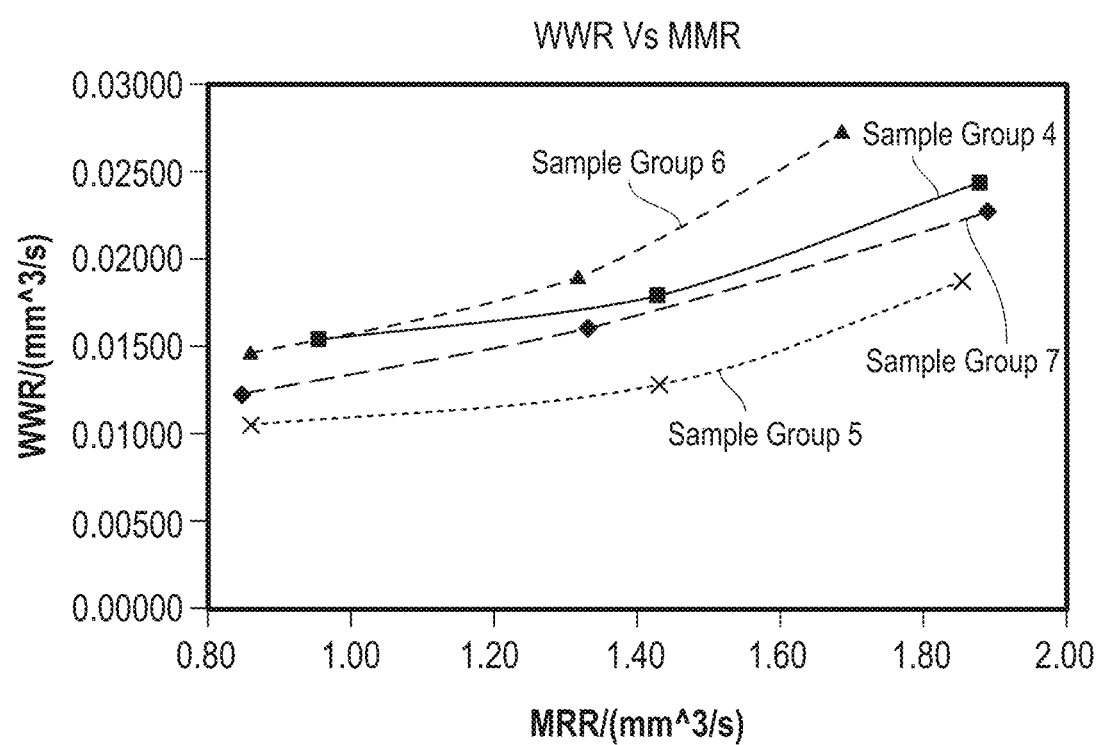
FIG. 6 includes plot of wear rate vs. material removal rate of abrasive samples.
Figure 7:
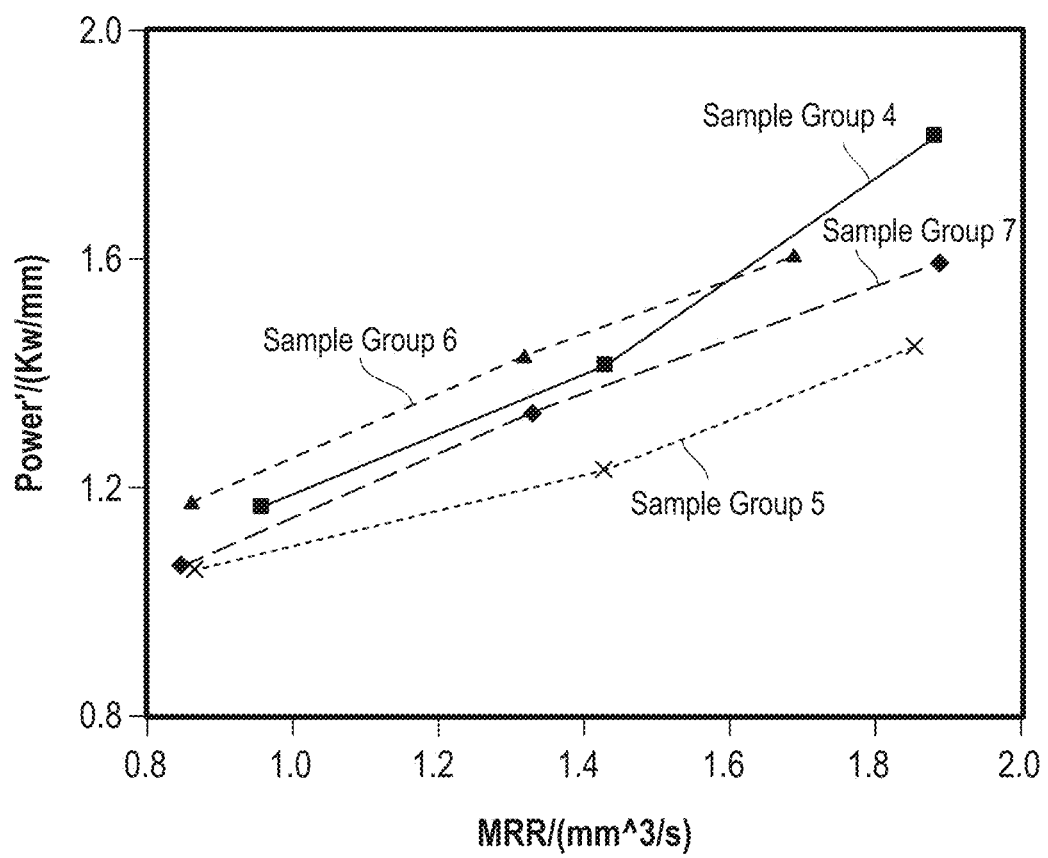
FIG. 7 includes plot of power draw vs. material removal rate of abrasive samples.
Figure 8:
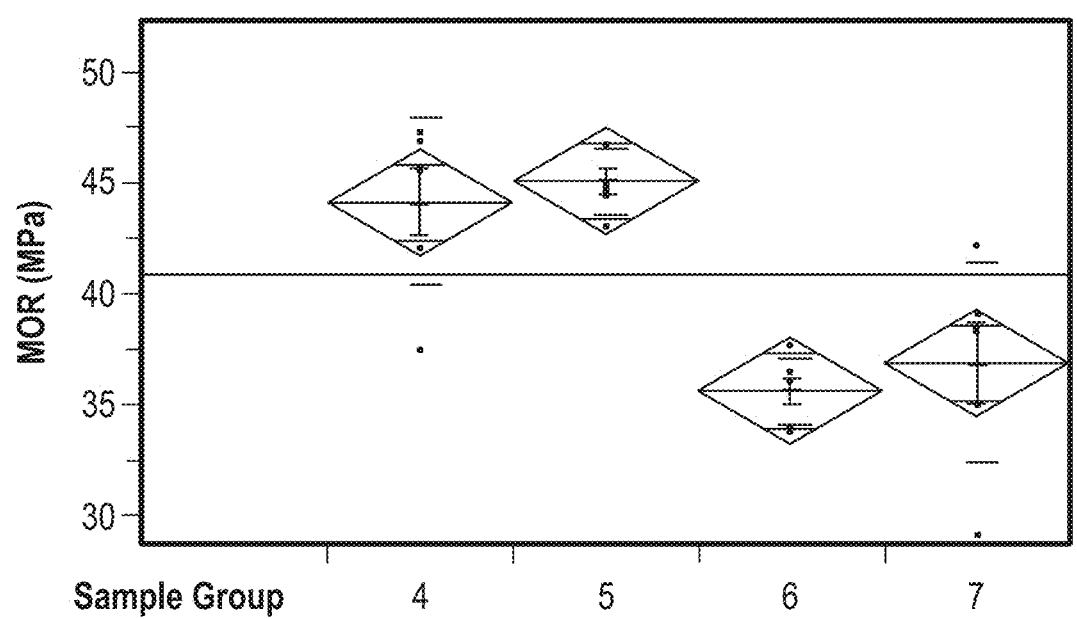
FIG. 8 includes an illustration of MOR of abrasive samples.

All the samples were tested on cutting 20CrMnTi Steel for evaluation of power draw vs. MRR, WWR vs. MRR, and MOR. Test data is illustrated in FIGS. 6 to 8. As illustrated in FIG. 6, Sample Group 5 demonstrated improved wear rate (WWR) when tested at the same material removal rates (MRR) compared to Sample Groups 4, 6, and 7. As illustrated in FIG. 7, Sample Group 5 demonstrated improved power draw when operated at the same material removal rates (MRR) compared to Sample Groups 4, 6, and 7. As illustrated in FIG. 8, Sample Group 5 demonstrated similar MOR compared to Sample Group 4. Sample Groups 6 and 7 demonstrated reduced MOR compared to Sample Group 4.

Example 3

Wheel samples were formed including the bond material noted in Table 3, abrasive particles, and porosity noted in Tables 5 to 6, as described in embodiments herein. The mixtures for forming the bonded abrasive bodies of each wheel Sample Group included a content of white fused alumina ceramic particles $V_{c/p}$ of 5 vol %. The ceramic particles had D50c of 22.996 microns.

Table 5 includes characteristics of different abrasive particles.

TABLE 5

| Abrasive particles | D50 (μm) | D10 (μm) | D90 (μm) | Material |
|---|---|---|---|---|
| A | 247 | 157 | 388 | Fused alumina |
| B | 165 | 105 | 259 | Ceramic alumina |
| C | 198 | 126 | 310 | Alumina with Cr2O3 |
| D | 198 | 126 | 310 | Fused alumina |
| E | 198 | 126 | 310 | Aluminum oxynitride |
| F | 198 | 126 | 310 | Monocrystalline alumina |

Table 6 includes compositions for wheel Sample Groups.

TABLE 6

| Sample Group | Bond content (vol %) | Porosity (vol %) | Abrasive particles | Total Content of Abrasive particles (vol %) |
|---|---|---|---|---|
| 8 | 9.12 | 46.88 | 42.5 wt % of B 57.5 wt % of C | 44 |
| 9 | 11.55 | 48.45 | 42.5 wt % of B 57.5 wt % of C | 40 |
| 10 | 14.61 | 45.39 | 42.5 wt % of B 57.5 wt % of C | 40 |
| 11 | 12.99 | 49.01 | 42.5 wt % of B 57.5 wt % of C | 38 |
| 12 | 11.55 | 48.45 | 42.5 wt % of B 57.5 wt % of C | 40 |
| 13 | 12.99 | 47.01 | 42.5 wt % of B 57.5 wt % of C | 40 |
| 14 | 8.11 | 47.89 | 45 wt % of E 55 wt % of D | 44 |
| 15 | 9.12 | 48.88 | 45 wt % of E 55 wt % of D | 42 |
| 16 | 8.11 | 47.89 | D | 44 |
| 17 | 9.12 | 48.88 | 45 wt % of E 55 wt % of D | 42 |

TABLE 6-continued

| Sample Group | Bond content (vol %) | Porosity (vol %) | Abrasive particles | Total Content of Abrasive particles (vol %) |
|---|---|---|---|---|
| 18 | 10.26 | 45.74 | D | 44 |
| 19 | 11.55 | 46.45 | D | 42 |
| 20 | 9.12 | 46.88 | 50 wt % of C 50 wt % of F | 44 |
| 21 | 10.26 | 47.74 | 50 wt % of C 50 wt % of F | 42 |
| 22 | 9.12 | 46.88 | 50 wt % of C 50 wt % of F | 44 |
| 23 | 10.26 | 47.74 | 50 wt % of C 50 wt % of F | 42 |

Sample Groups 8 to 23 are tested for MOR, wear rates, material removal rates, and power draw, and are expected to perform better than corresponding conventional wheels.

Example 4

Abrasive bar samples were made in the same manner as described in Example 1. The bond compositions of the samples are included in Table 7. All the bar samples include pink alumina abrasive grains having D50a of 247 microns at the content of 44 vol % and porosity of 46.88 vol % for the total volume of the bars. White alumina ceramic particles having different D50c were added at different contents to the bond compositions to form abrasive bar samples. Samples without the ceramic particles have a bond content of 9.12 vol % for the total volume of the bars. Samples including the ceramic particles have a total content of the bond and ceramic particles of 9.12 vol % for the total volume of the bars. Tables 8 includes the content and D50c of the ceramic particles for the abrasive bar samples.

Samples S24-0 to S24-9 have the bond composition S24. Similarly, Samples S25-0 to S25-9 have the bond composition S25, and Samples S26-0 to S26-9 have the bond composition S26. All the bar samples were tested by 3-point flexure for MOR based on ASTM C1161-02c(2008), Standard Test Method for Flexural Strength of Advanced Ceramics at Ambient Temperature, using Vernier Caliper MEA-PHY-013 with Load Cell of 30 kN, Speed of 1.27 mm/min and the support Span of 50.8 mm. MOR can be determined by the formula, $S=3PL/2bd^2$, where S represents MOR, P is peak break load in N, L is support span in mm, b is specimen width in mm, and d is specimen thickness in mm.

TABLE 7

| Bond Compositions | | | |
|---|---|---|---|
| | S24 | S25 | S26 |
| $SiO_2$ | 54-57 wt % | 58.5-61 wt % | 56-58.5 wt % |
| $Al_2O_3$ | 10-14 wt % | 19.5 to 22 wt % | 14.5 to 18 wt % |
| $Fe_2O_3$ | Up to 1 wt % | Up to 1 wt % | Up to 1 wt % |
| $TiO_2$ | Up to 1 wt % | Up to 1 wt % | Up to 1 wt % |
| CaO | Up to 1 wt % | 1-3 wt % | Up to 1 wt % |
| MgO | Up to 1 wt % | 2-6 wt % | Up to 1 wt % |
| $Li_2O$ | 1 to 5 wt % | Up to 1 wt % | 0.5-3 wt % |
| $Na_2O$ | 7.5-10 wt % | 4-7 wt % | 7.5-10 wt % |
| $K_2O$ | 0.5-2.5 wt % | 3-5 wt % | 0.5-2.5 wt % |
| $B_2O_3$ | 12-20 wt % | 1-4.5 wt % | 10-16 wt % |

TABLE 8

| Sample | D50c (microns) | Vc/p |
|---|---|---|
| S24-0 | / | 0 vol % |
| S24-1 | 69 | 4 vol % |
| S24-2 | 69 | 8 vol % |
| S24-3 | 23 | 4 vol % |
| S24-4 | 23 | 8 vol % |
| S24-5 | 23 | 12 vol % |
| S24-6 | 15 | 4 vol % |
| S24-7 | 15 | 8 vol % |
| S24-8 | 7 | 4 vol % |
| S24-9 | 7 | 8 vol % |
| S25-0 | / | 0 vol % |
| S25-1 | 69 | 4 vol % |
| S25-2 | 69 | 8 vol % |
| S25-3 | 23 | 4 vol % |
| S25-4 | 23 | 8 vol % |
| S25-5 | 23 | 12 vol % |
| S25-6 | 15 | 4 vol % |
| S25-7 | 15 | 8 vol % |
| S25-8 | 7 | 4 vol % |
| S25-9 | 7 | 8 vol % |
| S26-0 | / | 0 vol % |
| S26-1 | 69 | 4 vol % |
| S26-2 | 69 | 8 vol % |
| S26-3 | 23 | 4 vol % |
| S26-4 | 23 | 8 vol % |
| S26-5 | 23 | 12 vol % |
| S26-6 | 15 | 4 vol % |
| S26-7 | 15 | 8 vol % |
| S26-8 | 7 | 4 vol % |
| S26-9 | 7 | 8 vol % |

FIGS. 10 to 14 include illustrations of MOR of the samples having the bond composition S24. As illustrated, Samples S24-1 and S24-3 to S24-9 had similar MOR and Samples S24-2 demonstrated significant improvement of MOR compared to S24-0 samples that do not have the ceramic particles.

FIGS. 15 to 19 include illustrations of MOR of the samples having the bond composition S25. As illustrated, Samples S25-1 to S25-3 had similar MOR compared to Samples S25-0 and improved MOR compared to Samples S25-4 to S25-9.

FIGS. 20 to 24 include illustrations of MOR of the samples having the bond composition S26. As illustrated, Samples S26-1 to S26-9 had similar MOR compared to S26-0 samples that do not have the ceramic particles.

Example 5

Cutting wheel Samples S29 and CS30 were formed in accordance with embodiments herein except Samples CS30 do not include ceramic particles. Both Samples S29 and CS30 include the bond material noted in Table 9, 44 vol % of pink alumina abrasive particles having D50c of 247 microns, and 46.88 vol % of porosity for the total volume of the respective abrasive body. Samples CS30 include the bond material of 9.12 vol % for the total volume of the abrasive body. Samples S29 include a total content of the bond material and ceramic particles of 9.12 vol % for the total volume of the abrasive body. Samples S29 are formed with white alumina ceramic particles having D50c of 23 microns at the content of 4 vol % for the total volume of the bond material and the ceramic particles.

TABLE 9

| Composition | Content |
|---|---|
| $SiO_2$ | 66-70 wt % |
| $Al_2O_3$ | 13-16 wt % |

TABLE 9-continued

| Composition | Content |
| --- | --- |
| $Fe_2O_3$ | up to 1 wt % |
| $TiO_2$ | up to 1 wt % |
| CaO | 2 to 5 wt % |
| MgO | 1 to 4 wt % |
| $Li_2O$ | 0.5 to 3 wt % |
| $Na_2O$ | 2 to 6 wt % |
| $K_2O$ | 1 to 4 wt % |
| $B_2O_3$ | 1 to 4 wt % |

Figure 25:
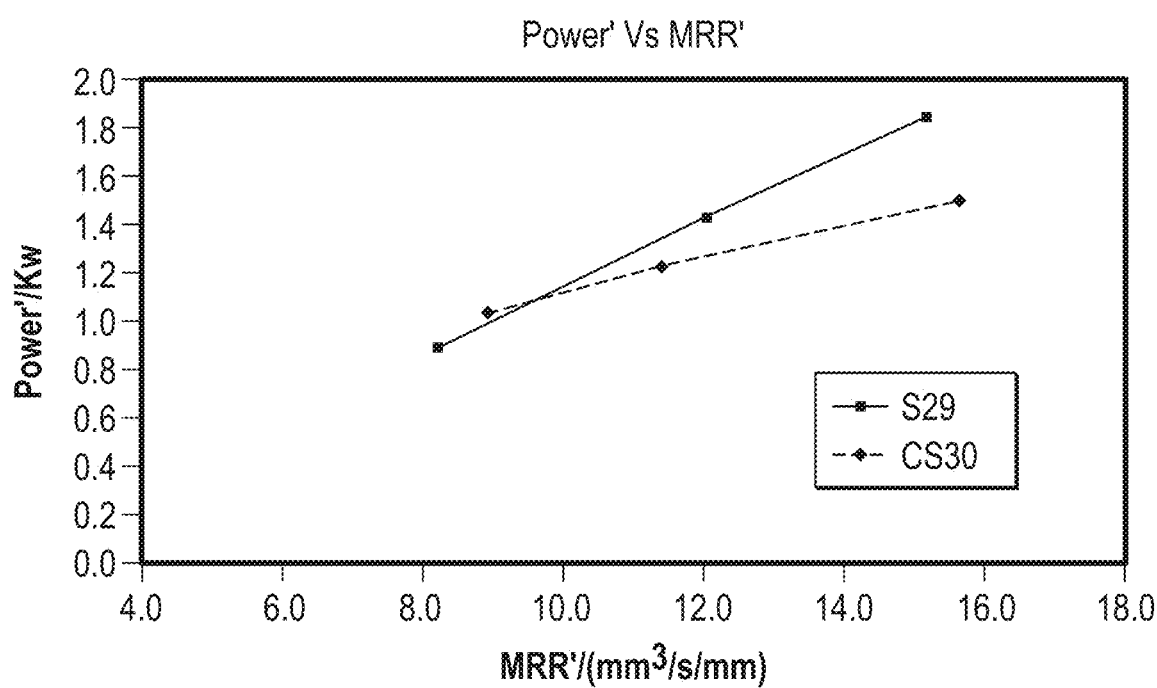
FIG. 25 includes a plot of power draw vs. material removal rates.
Figure 26:
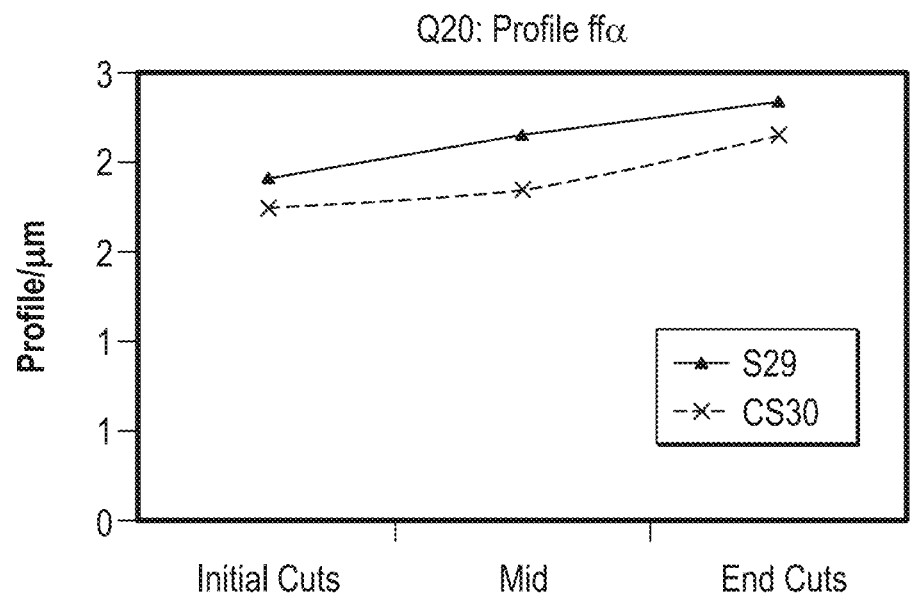
FIG. 26 includes an illustration of profile retention of profile ffα over a cutting process.
Figure 27:
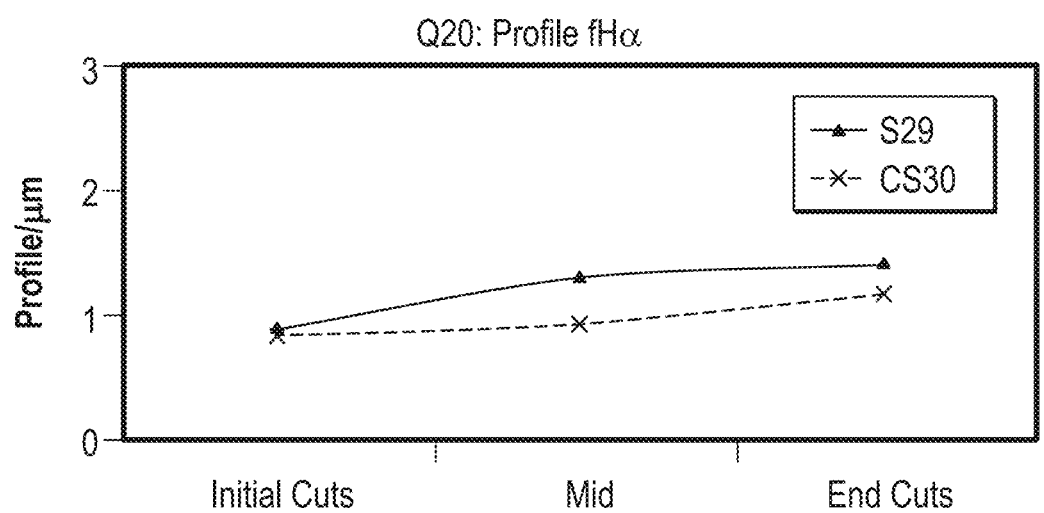
FIG. 27 includes an illustration of profile retention of profile fHα over a cutting process.

Samples S29 and CS30 were tested on cutting workpieces of 20CrMnTi steel for evaluation of material removal rates vs. power draw and profile retention including ffα and fHα, and test results are included in FIGS. 25 to 26. As illustrated, Samples S29 did not demonstrate improvement over CS30.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An abrasive article, comprising:
   a body including:
      a bond material extending through at least a portion of the body wherein the bond material comprises a vitreous phase;
      abrasive particles contained in the body, the abrasive particles having an average particle size (D50a) of at least 100 microns; and
      ceramic particles contained in the bond material, the ceramic particles present as a discrete phase from the vitreous phase of the bond material, wherein the ceramic particles comprise an average particle size (D50c) of at least 2 microns and at most 75 microns.

2. The abrasive article of claim 1, wherein the ceramic particles comprise the average particle size (D50c) of at least 6 microns.

3. The abrasive article of claim 1, wherein the ceramic particles comprise the average particle size (D50c) of greater than 12 microns.

4. The abrasive article of claim 1, wherein the ceramic particles comprise the average particle size (D50c) of at least 6 microns and at most 69 microns.

5. The abrasive article of claim 1, wherein the body comprises ceramic particles in a content of at most 12 vol % for a total volume of the ceramic particles and bond material.

6. The abrasive article of claim 1, wherein the bond material comprises $SiO_2$, wherein a content of $SiO_2$ is less than 66 wt % for a total weight of the bond material.

7. The abrasive article of claim 1, wherein the bond material comprises $B_2O_3$, wherein a content of $B_2O_3$ is at least 5 wt % for a total weight of the bond material.

8. The abrasive article of claim 1, wherein the bond material comprises $SiO_2$ and $B_2O_3$, wherein a weight percent silicon oxide ($SiO_2$):weight percent boron oxide ($B_2O_3$) is at most 19:1.

9. The abrasive article of claim 1, wherein the bond material comprises $SiO_2$ and $Al_2O_3$, wherein a total content of $SiO_2$ and $Al_2O_3$ is at least 50 wt % and at most 77 wt % for a total weight of the bond material.

10. The abrasive article of claim 1, wherein the ceramic particles comprise a material including an oxide, a carbide, a nitride, borides, oxycarbides, oxynitrides, silicates, or any combination thereof.

11. The abrasive article of claim 1, wherein a ratio of D50a/D50c is at least 4.

12. The abrasive article of claim 1, wherein a ratio of D50a/D50c is not greater than 35.

13. The abrasive article of claim 1, wherein a ratio of D50a/D50c is at least 4 and not greater than 35.

14. The abrasive article of claim 1, wherein the ceramic particles comprise alumina.

* * * * *